United States Patent
Nishikawa et al.

(10) Patent No.: US 10,302,194 B2
(45) Date of Patent: May 28, 2019

(54) SHIFT CHANGE PRACTICE DEVICE

(71) Applicant: HONDA MOTOR CO., LTD., Tokyo (JP)

(72) Inventors: Yuji Nishikawa, Wako (JP); Akira Nakamura, Wako (JP); Yoshiaki Nedachi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 231 days.

(21) Appl. No.: 15/475,517

(22) Filed: Mar. 31, 2017

(65) Prior Publication Data

US 2017/0284543 A1 Oct. 5, 2017

(30) Foreign Application Priority Data

Mar. 31, 2016 (JP) .................................. 2016-070382

(51) Int. Cl.
*F16H 63/42* (2006.01)
*F16H 59/44* (2006.01)
(Continued)

(52) U.S. Cl.
CPC ............. *F16H 63/42* (2013.01); *F16H 59/44* (2013.01); *F16H 59/48* (2013.01); *F16H 59/56* (2013.01);
(Continued)

(58) Field of Classification Search
None
See application file for complete search history.

(56) References Cited

U.S. PATENT DOCUMENTS 3,147,835 A * 9/1964 Thomas ................. F16D 27/02
192/21.5
4,463,427 A * 7/1984 Bonnetain ............... F16H 63/42
477/34
(Continued)

FOREIGN PATENT DOCUMENTS

JP 58-40769 U1 3/1983
JP 61-16144 A 1/1986
(Continued)

OTHER PUBLICATIONS

Office Action dated Feb. 6, 2018, issued in counterpart Japanese Application No. 2016-070382, with English machine translation. (12 pages).

*Primary Examiner* — Colby M Hansen
(74) *Attorney, Agent, or Firm* — Westerman, Hattori, Daniels & Adrian, LLP

(57) ABSTRACT

A shift change practice device capable of improving the effect of learning a shift change operation is provided. The shift change practice device includes: an optimum speed calculation unit that calculates an optimum value or an optimum range of an engine revolution speed in the event of a shift change; a revolution speed comparison unit that determines whether or not a detected revolution speed that is a detected value of the engine revolution speed is equal to the optimum value or whether or not the detected revolution speed is included in the optimum range, in a state where a clutch is disconnected; and a notification instruction unit that instructs a notification device to give a predetermined notification to a driver when the detected revolution speed is equal to the optimum value or the detected revolution speed is included in the optimum range, in the state where the clutch is disconnected.

18 Claims, 16 Drawing Sheets

(51) Int. Cl.

| | |
|---|---|
| *F16H 59/56* | (2006.01) |
| *G09B 19/16* | (2006.01) |
| *F16H 59/48* | (2006.01) |
| *F16H 61/04* | (2006.01) |
| *F16H 59/14* | (2006.01) |
| *F16H 59/36* | (2006.01) |

(52) U.S. Cl.
CPC ....... *F16H 61/0403* (2013.01); *G09B 19/167* (2013.01); *B60Y 2400/71* (2013.01); *F16H 2059/147* (2013.01); *F16H 2059/366* (2013.01); *F16H 2063/426* (2013.01); *F16H 2306/54* (2013.01)

(56) References Cited

U.S. PATENT DOCUMENTS 4,622,637 A * 11/1986 Tomita ................ F16H 61/0213
    340/439
6,356,831 B1 * 3/2002 Michelini ............. B60W 10/06
    340/438

FOREIGN PATENT DOCUMENTS

| JP | 2006-153556 A | 6/2006 |
|---|---|---|
| JP | 2006-171437 A | 6/2006 |
| JP | 2017-24499 A | 2/2017 |
| JP | 2017-173419 A | 9/2017 |

\* cited by examiner

SHIFT CHANGE PRACTICE DEVICE

CROSS REFERENCES TO RELATED APPLICATIONS

The present application claims priority under 35 U.S.C. § 119 to Japanese Patent Application No. 2016-070382, filed Mar. 31, 2016, entitled "Shift Change Practice Device." The contents of this application are incorporated herein by reference in their entirety.

BACKGROUND

1. Field

The present disclosure relates to a shift change practice or training device for practicing a shift change operation in a manual transmission vehicle.

2. Description of the Related Art

Japanese Unexamined Patent Application Publication No. 2006-153556 points out the issues related to an accelerator operation (so-called heel-and-toe or the like) just before shift change. Specifically, Japanese Unexamined Patent Application Publication No. 2006-153556 ([0007]) points out that, since a driver has heretofore determined an amount of revving according to his/her own rule of thumb based on a vehicle speed, the number of gear stages, an engine speed, and the like in the event of shift-down, the driver having no grasp of relationships among these could not accurately obtain the amount of revving. Therefore, Japanese Unexamined Patent Application Publication No. 2006-153556 ([0008] and Abstract) aims to provide a rev counter that enables smooth driving by grasping the engine speed after a shift change at the current running speed, before the shift change.

To this end, in Japanese Unexamined Patent Application Publication No. 2006-153556 (Abstract), the rev counter includes an auxiliary indicator 40*a* that displays the engine speed in the event of shift-down to a gear immediately below the currently used gear stage, and an auxiliary indicator 40*b* that displays the engine speed in the event of shift-up to a gear immediately above the currently used gear stage, in addition to a main indicator 30 that displays the engine speed at the currently used gear position. The engine speeds indicated by the auxiliary indicators 40*a* and 40*b* are calculated by a post-shift engine speed calculation unit 76 based on the current engine speed, a transmission gear ratio of the gear immediately below the current one, and a transmission gear ratio of the gear immediately above the current one. Instead of the auxiliary indicators 40*a* and 40*b* different in shape from the main indicator 30 and provided on the peripheral side of a dial 22, light-emitting diodes 50*a* and 50*b* or liquid crystal plates 60*a* and 60*b* can be used.

As described above, in Japanese Unexamined Patent Application Publication No. 2006-153556 (Abstract), the auxiliary indicators 40*a* and 40*b*, the light-emitting diodes 50*a* and 50*b*, or the liquid crystal plates 60*a* and 60*b* display the engine speed in the event of shift-down or shift-up to a gear immediately below or above the currently used gear stage. However, in Japanese Unexamined Patent Application Publication No. 2006-153556, the driver himself/herself needs to check the relationship between the main indicator 30 (indicating the current value of the engine speed per unit time) and the auxiliary indicators 40*a* and 40*b* (indicating the engine speed in the event of a shift change) or the like. Therefore, there is room for improvement in terms of improving the learning effect of the driver.

SUMMARY OF THE INVENTION

The present application describes a shift change practice device capable of improving the effect of learning a shift change operation.

A shift change practice device according to one embodiment of the present disclosure is for practicing a shift change operation in a manual transmission vehicle, and includes: an optimum speed calculation unit that calculates an optimum value or an optimum range of an engine revolution speed in the event of a shift change; a revolution speed comparison unit that determines whether or not a detected revolution speed that is a detected value of the engine revolution speed is equal to the optimum value or whether or not the detected revolution speed is included in the optimum range, in a state where a clutch is disconnected; and a notification instruction unit that instructs a notification device to give a predetermined notification to a driver when the detected revolution speed is equal to the optimum value or the detected revolution speed is included in the optimum range, in the state where the clutch is disconnected.

According to one embodiment of the present disclosure, when the detected revolution speed is equal to the optimum value or is included in the optimum range in the state where the clutch is disconnected for a shift change, the notification device is instructed to give a predetermined notification to the driver. As a result, the notification device gives the predetermined notification. Thus, the driver can learn, from the notification given by the notification device, the optimum value or the optimum range in the event of a shift change without determining himself/herself the relationship between the detected revolution speed (current value) and the optimum value or the optimum range before reconnection of the clutch. Therefore, the effect of learning the shift change operation can be enhanced.

The notification instruction unit may instruct a vibration generator for a shift knob to generate vibration when the detected revolution speed is equal to the optimum value or the detected revolution speed is included in the optimum range. As a result, the vibration generator generates vibration in the shift knob. Thus, the driver can learn, through the vibration in the shift knob, the optimum value or the optimum range of the engine revolution speed during the shift change without looking at the display device such as a meter.

A shift change practice device according to one embodiment of the present disclosure is for practicing a shift change operation in a manual transmission vehicle, and includes: an optimum speed calculation unit that calculates an optimum value or an optimum range of an engine revolution speed in the event of a shift change; a difference calculation unit that calculates a difference between a detected revolution speed that is a detected value of the engine revolution speed and the optimum value or the optimum range; and a notification instruction unit that instructs a notification device to give a notification indicating the difference.

According to one embodiment of the present disclosure, when a shift change is performed, the notification device is instructed to give a notification indicating the difference between the detected revolution speed and the optimum value or the optimum range. As a result, the notification device gives the notification indicating the difference. Thus, the driver can recognize the difference between the detected revolution speed and the optimum value or the optimum range immediately after the shift change without determining himself/herself the difference during the shift change. Therefore, the effect of learning the shift change operation can be enhanced.

The notification instruction unit may instruct a speaker as the notification device to output short sounds, the number of which corresponds to the difference. As a result, the speaker outputs the short sounds. Thus, the driver can easily recognize the difference between the detected revolution speed and the optimum value or the optimum range, by referring to the number of the short sounds.

The notification instruction unit may change a pitch of the short sound according to a positive or negative sign of the difference. Thus, the driver can easily recognize whether the detected revolution speed during the shift change is excessive or insufficient.

The notification instruction unit may instruct a display device as the notification device to display an evaluation result corresponding to the difference for a predetermined period of time. Thus, the driver can confirm a specific meaning of the difference.

The shift change practice device may further include a correction unit that corrects an evaluation result according to a size of impact associated with reconnection of a clutch for the shift change. Even if there is a large difference between the detected revolution speed and the optimum value or the optimum range, there is a case where evaluation can be made that an appropriate shift change operation is performed, depending on a method for using half-clutch. Therefore, the shift change operation can be evaluated from diverse points of view by correcting the evaluation result according to the magnitude of impact associated with reconnection of the clutch.

The correction unit may correct the evaluation result only during a predetermined period after the start of the shift change operation. Thus, the reliability of the evaluation result can be improved by eliminating the impact unrelated to the shift change operation.

The optimum speed calculation unit may correct the optimum value or the optimum range corresponding to a vehicle speed of the manual transmission vehicle based on a deceleration of the manual transmission vehicle. Thus, the driver can learn a more appropriate optimum value or an optimum range by using the optimum value or the optimum range corresponding to the engine revolution speed when the clutch is actually reconnected at a time point shortly after the current time point.

The shift change practice device may further include a clutch state estimation unit that estimates that the clutch is set in an unconnected state when an engine torque goes to zero after reaching a negative value or an engine rotational acceleration that is a time differential value of the engine revolution speed goes below an acceleration threshold. Alternatively, the shift change practice device may further include a clutch state estimation unit that estimates that the clutch is set in an unconnected state when an increase or decrease in the engine revolution speed does not correspond to an increase or decrease in the vehicle speed.

Thus, when to start a shift change can be determined even when a signal (clutch signal) indicating the connection state of the clutch cannot be used due to specifications or failure.

The shift change practice device may further include a display controller that displays a revolution speed indicator whose dimension changes according to the detected revolution speed and an optimum notification mark having its display position change with respect to a display range of the revolution speed indicator according to the optimum value or the optimum range. Thus, the driver can easily visually recognize the relationship between the detected revolution speed and the optimum value or the optimum range in the event of a shift change.

The revolution speed indicator may have a circular shape whose size concentrically changes according to the detected revolution speed. The optimum notification mark may be a ring mark that is arranged concentrically with the revolution speed indicator. Thus, the driver can more easily visually recognize the relationship between the detected revolution speed and the optimum value or the optimum range in the event of a shift change. The word "unit" used in this application may mean a physical part or component of computer hardware or any device including a controller, a processor, a memory, etc., which is particularly configured to perform functions and steps disclosed in the application.

DESCRIPTION OF THE PREFERRED EMBODIMENTS

A. Embodiment

<A-1. Configuration>

[A-1-1. Entire Configuration]

Figure 1:
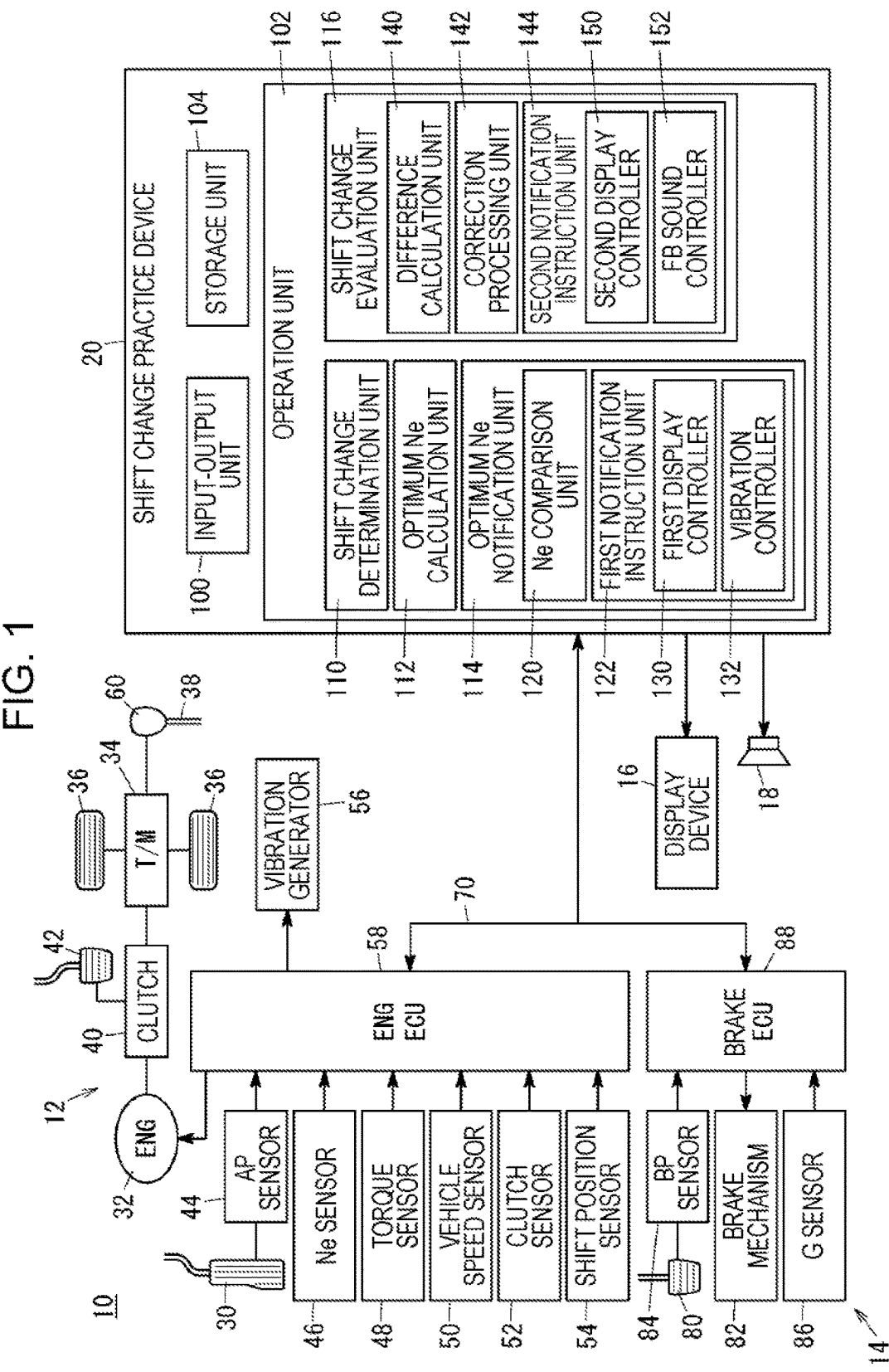
FIG. 1 is a diagram showing a schematic configuration of a vehicle including a shift change practice device according to an embodiment.

FIG. 1 is a diagram showing a schematic configuration of a vehicle 10 including a shift change practice device 20 (hereinafter also referred to as the "practice device 20") according to an embodiment. The vehicle 10 is a manual transmission vehicle (MT vehicle). The vehicle 10 includes a drive system 12 that controls drive force of the vehicle 10, a braking system 14 that controls braking force of the vehicle 10, a display device 16, and a speaker 18, in addition to the practice device 20.

In this embodiment, a driver (not shown) can practice a shift change operation of a transmission 34 (hereinafter also referred to as the "T/M 34") in the drive system 12 by use of the practice device 20.

[A-1-2. Drive System 12]

The drive system 12 includes an accelerator pedal 30, an engine 32, wheels 36, a shift lever 38, a clutch 40, a clutch pedal 42, an accelerator pedal sensor 44, a revolution speed sensor 46, a torque sensor 48, a vehicle speed sensor 50, a clutch sensor 52, a shift position sensor 54, a vibration generator 56, an engine electronic control unit 58 (hereinafter referred to as the "engine ECU 58" or "ENG ECU 58"), in addition to the T/M 34.

The accelerator pedal sensor 44 (hereinafter also referred to as the "AP sensor 44" or "sensor 44") detects an operation amount θap (hereinafter referred to as the "AP operation amount θap") [deg] of the accelerator pedal 30. The revolution speed sensor 46 (hereinafter also referred to as the "Ne sensor 46" or "sensor 46") detects the number of revolutions Ne (hereinafter the "engine revolution speed Ne" or "revolution speed Ne") [rpm] of the engine 32 per unit time. The detected revolution speed Ne is also referred to as the "detected revolution speed Ne".

The torque sensor 48 (hereinafter also referred to as the "sensor 48") detects a torque Teng (hereinafter also referred to as the "engine torque Teng") [N·m] of the engine 32. The vehicle speed sensor 50 detects a vehicle speed V [km/h] of the vehicle 10.

The clutch sensor 52 (hereinafter also referred to as the "sensor 52") detects a connection state Scl (hereinafter also referred to as the "clutch state Scl") of the clutch 40. The clutch state Scl includes ON (connected state) and OFF (unconnected state). The shift position sensor 54 (hereinafter also referred to as the "sensor 54") detects a shift position Ps of the transmission 34.

The values detected by the respective sensors 44, 46, 48, 50, 52, and 54 are outputted to the ENG ECU 58. Alternatively, the respective sensors 44, 46, 48, 50, 52, and 54 can also be configured by the ENG ECU 58 processing outputs from detection elements included in the respective sensors 44, 46, 48, 50, 52, and 54.

The vibration generator 56 (notification device) generates vibration in a shift knob 60 of the shift lever 38 based on an instruction from the ENG ECU 58.

The ENG ECU 58 controls the entire drive system 12. For example, the ENG ECU 58 controls the output of the engine 32 based on the AP operation amount θap, the revolution speed Ne, the torque Teng, and the vehicle speed V. The ENG ECU 58 outputs the detected values from the respective sensors 44, 46, 48, 50, 52, and 54 to an in-vehicle network 70 at a predetermined timing.

[A-1-3. Braking System 14]

The braking system 14 includes a brake pedal 80, a brake mechanism 82, a brake pedal sensor 84, an acceleration sensor 86, and a brake electronic control unit 88 (hereinafter referred to as the "brake ECU 88").

The brake mechanism 82 includes an unillustrated hydraulic mechanism and the like, and imparts frictional braking force to the wheels 36 based on an instruction from the brake ECU 88. The brake pedal sensor 84 (hereinafter also referred to as the "BP sensor 84" or "sensor 84") detects an operation amount θbp (hereinafter referred to as the "BP operation amount θbp") of the brake pedal 80. In this embodiment, the BP sensor 84 is used as a deceleration sensor indicating the deceleration of the vehicle 10.

The acceleration sensor 86 (hereinafter also referred to as the "sensor 86") detects an acceleration Glgt (hereinafter referred to as the "longitudinal acceleration Glgt") [m/s/s] in a longitudinal direction of the vehicle 10. In this embodiment, the acceleration Glgt is used as an indicator of the magnitude of impact associated with reconnection of the clutch 40 for a shift change.

The detected values from the respective sensors 84 and 86 are outputted to the brake ECU 88.

The brake ECU 88 controls the entire braking system 14. For example, the brake ECU 88 controls operations of the brake mechanism 82 based on the BP operation amount θbp. The brake ECU 88 outputs the detected values from the respective sensors 84 and 86 to the in-vehicle network 70 at a predetermined timing.

[A-1-4. Display Device 16 and Speaker 18]

The display device 16 (notification device) performs display based on an instruction from the shift change practice device 20, for example. The display device 16 includes a meter disposed in a front panel of the vehicle 10, for example, but is not limited thereto. The display device 16 may be provided in the practice device 20.

The speaker 18 (notification device) outputs a sound based on an instruction from the shift change practice device 20, for example. The speaker 18 is mounted on the vehicle 10, for example. The speaker 18 may be provided in the practice device 20.

[A-1-5. Shift Change Practice Device 20]

[A-1-5-1. Overview of Shift Change Practice Device 20]

The shift change practice device 20 is for the driver to practice a shift change operation. The shift change operation described here includes both of a shift-down operation and a shift-up operation. Alternatively, the practice device 20 may also be configured to practice only one of the shift-down operation and the shift-up operation. The shift change operation includes operations of the accelerator pedal 30, the clutch pedal 42, and the brake pedal 80.

The practice device 20 has its hardware mounted on the vehicle 10 and disposed inside a vehicle body. Alternatively, the practice device 20 may be configured as a portable terminal such as a smartphone and connected to the in-vehicle network 70 through wireless communication (for example, Bluetooth (registered trademark)) or a communication cable.

As shown in FIG. 1, the practice device 20 includes an input-output unit 100, an operation unit 102, and a storage unit 104. The input-output unit 100 inputs and outputs signals. The input-output unit 100 can include an analog/digital converter and a digital/analog converter. The operation unit 102 uses programs and data stored in the storage unit 104 to execute various kinds of control. The operation unit 102 includes a central processing unit (CPU). The operation unit 102 is described in detail later.

The storage unit 104 stores the programs and data to be used by the operation unit 102, and includes a random access memory (hereinafter referred to as the "RAM"). As the RAM, a volatile memory such as a register and a non-volatile memory such as a flash memory can be used. Also, the storage unit 104 may include a read-only memory (hereinafter referred to as the "ROM"), in addition to the RAM.

(A-1-5-2. Operation Unit 102)

As shown in FIG. 1, the operation unit 102 includes a shift change determination unit 110, an optimum revolution speed calculation unit 112, an optimum revolution speed notification unit 114, and a shift change evaluation unit 116.

The shift change determination unit 110 (hereinafter also referred to as the "determination unit 110") determines the start and end of a shift change.

The optimum revolution speed calculation unit 112 (hereinafter also referred to as the "optimum Ne calculation unit 112") calculates an optimum revolution speed Ne (hereinafter also referred to as the "optimum speed Nopt" or "optimum Ne") [rpm]. The optimum speed Nopt described here is the revolution speed Ne suitable for a shift position Ps after the shift change, i.e., a second shift position (to be described in detail in relation to Step S22 in FIG. 3).

The optimum revolution speed notification unit 114 (hereinafter also referred to as the "optimum Ne notification unit 114" or "notification unit 114") executes optimum revolution speed notification control (hereinafter also referred to as the "optimum Ne notification control") to notify the driver of the optimum Ne. The notification unit 114 includes a revolution speed comparison unit 120 (hereinafter also referred to as the "Ne comparison unit 120") and a first notification instruction unit 122.

In the optimum Ne notification control, the Ne comparison unit 120 compares the detected revolution speed Ne detected by the Ne sensor 46 with the optimum Ne calculated by the optimum Ne calculation unit 112, and outputs the comparison result. The first notification instruction unit 122 performs a predetermined notification (optimum Ne notification) to the driver based on the comparison result from the Ne comparison unit 120.

When the detected revolution speed Ne is included in the optimum range Ropt (to be described later) in a state where the clutch 40 is off (unconnected state), the first notification instruction unit 122 instructs the display device 16 and the vibration generator 56 to give a predetermined notification to the driver.

The first notification instruction unit 122 includes a first display controller 130 and a vibration controller 132. The first display controller 130 controls display on the display device 16 in the optimum Ne notification control. The vibration controller 132 controls the vibration generator 56 through the engine ECU 58 in the optimum Ne notification control. Alternatively, the vibration controller 132 may directly control the vibration generator 56 without through the engine ECU 58.

The shift change evaluation unit 116 (hereinafter also referred to as the "evaluation unit 116") executes evaluation result notification control to evaluate the shift change operation and then notify the evaluation result. The evaluation unit 116 includes a difference calculation unit 140, a correction processing unit 142, and a second notification instruction unit 144.

The difference calculation unit 140 calculates a difference Dne [rpm] between the detected revolution speed Ne and the optimum Ne during the shift change. The correction processing unit 142 (correction unit) executes correction processing using the longitudinal acceleration Glgt. In the correction processing, the evaluation result is corrected according to the magnitude of impact (here, the longitudinal acceleration Glgt) associated with reconnection of the clutch 40 for a shift change. The correction processing is described in detail later with reference to FIG. 6 and the like.

The second notification instruction unit 144 gives a predetermined notification (evaluation result notification) to the driver based on the difference Dne calculated by the difference calculation unit 140 and the result of the correction processing executed by the correction processing unit 142. The second notification instruction unit 144 instructs the display device 16 and the speaker 18 to notify the difference Dne.

The second notification instruction unit 144 includes a second display controller 150 and a feedback sound controller 152 (hereinafter also referred to as the "FB sound controller 152"). The second display controller 150 controls display on the display device 16 in the evaluation result notification control. The FB sound controller 152 controls an output sound from the speaker 18 in the evaluation result notification control.

<A-2. Control>

[A-2-1. Overview of Shift Change Practice Control]

Next, description is given of shift change practice control according to this embodiment. The shift change practice control is control for the driver to practice the shift change operation, and is executed by the operation unit 102 in the practice device 20.

Figure 2:
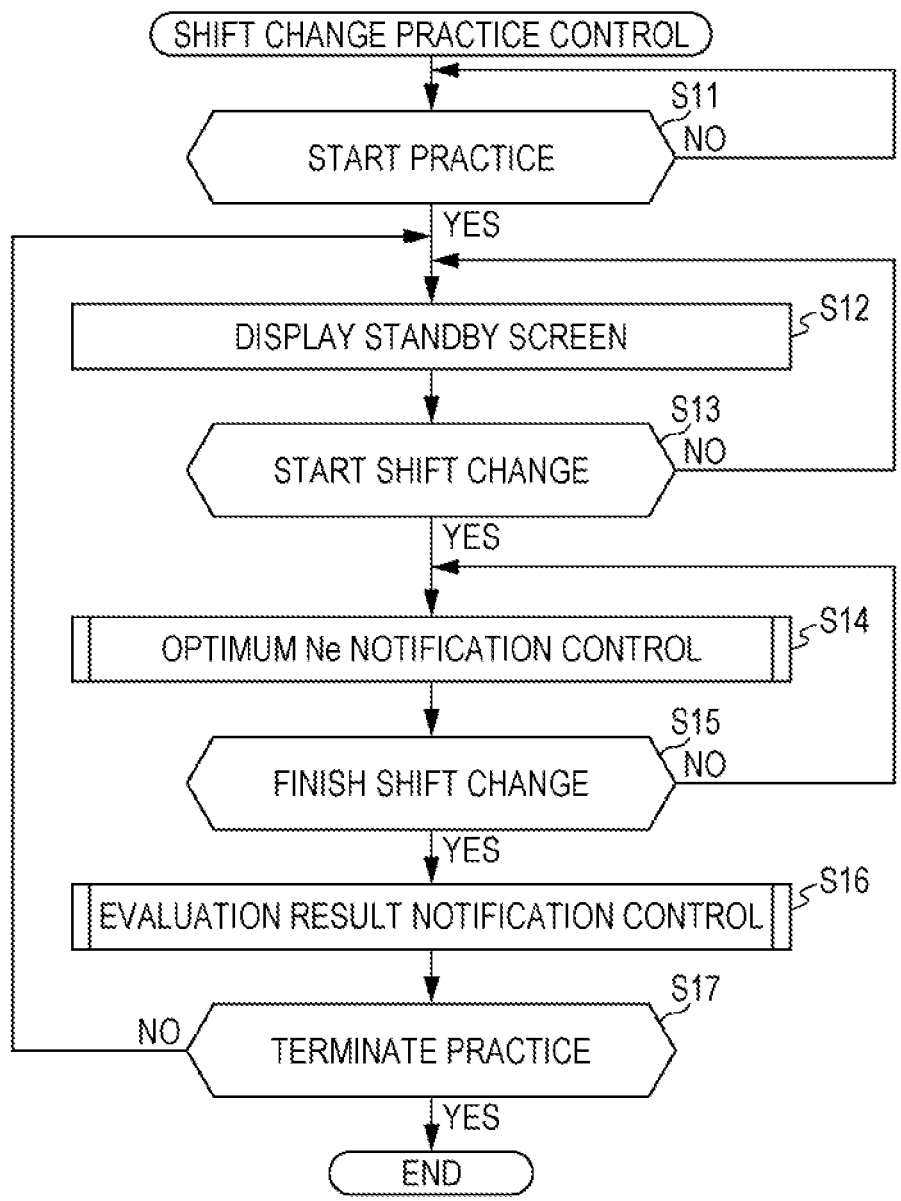
FIG. 2 is a flowchart of shift change practice control according to the embodiment.

FIG. 2 is a flowchart of the shift change practice control according to this embodiment. In Step S11, the practice device 20 determines whether or not to start shift change practice. The determination is made based on whether or not a practice start instruction is inputted to the vehicle 10 or an operation input unit (not shown) in the practice device 20, for example, by a user. When starting the practice (S11: YES), the processing advances to Step S12. When not starting the practice (S11: NO), Step S11 is repeated.

In Step S12, the practice device 20 displays a standby screen on the display device 16. The standby screen described here may be the same screen as a display screen 200 (FIG. 4) in the optimum Ne notification control to be described later, for example. Alternatively, the display device 16 may display contents specific to the standby screen (for example, characters "practicing shift change"). Note that, when the user makes an input to end or stop the practice on the currently displayed standby screen, the shift change practice control is stopped.

In Step S13, the shift change determination unit 110 in the practice device 20 determines whether or not a shift change (shift change operation by the driver) is started. The determination is made based on the clutch state Scl detected by the clutch sensor 52. More specifically, when the clutch state Scl received through the engine ECU 58 is switched from the connected state (ON state) to the unconnected state (OFF state), the practice device 20 determines that the shift change is started. Alternatively, the start of the shift change can also be determined by another method (to be described later).

When the shift change is not started (S13: NO), the processing returns to Step S12. When the shift change is started (S13: YES), the processing advances to Step S14.

In Step S14, the practice device 20 executes the optimum Ne notification control. As described above, the optimum Ne notification control is control to notify the driver of the optimum Ne. The optimum Ne notification control enables the driver to recognize the optimum Ne during the shift change. The optimum Ne notification control is described in detail later with reference to FIGS. 3 and 4.

In Step S15, the practice device 20 determines whether or not the shift change is finished. The determination is made based on the clutch state Scl detected by the clutch sensor 52. More specifically, when the clutch state Scl is switched from the unconnected state (OFF state) to the connected state (ON state), the practice device 20 determines that the shift change is finished. Alternatively, the end of the shift change can also be determined by another method (to be described later).

When the shift change is not finished (S15: NO), the processing returns to Step S14 to continue the optimum Ne notification control. When the shift change is finished (S15: YES), the processing advances to Step S16 after terminating the optimum Ne notification control.

In Step S16, the practice device 20 executes the evaluation result notification control. As described above, the evaluation result notification control is control to evaluate the shift change operation by the driver and then notify the evaluation result. The evaluation result notification control enables the driver to check his/her own shift change operation skill. The evaluation result notification control is described in detail later with reference to FIGS. 5 to 12.

In Step S17, the practice device 20 determines whether or not to terminate the shift change practice. The determination is made based on whether or not a practice end instruction is inputted to the operation input unit by the user, for example. When not terminating the practice (S17: NO), the processing returns to Step S12 to continue the practice of the shift change operation. When terminating the shift change practice (S17: YES), the current shift change practice control is terminated.

[A-2-2. Optimum Ne Notification Control]
(A-2-2-1. Overall Flow of Optimum Ne Notification Control)

Figure 3:
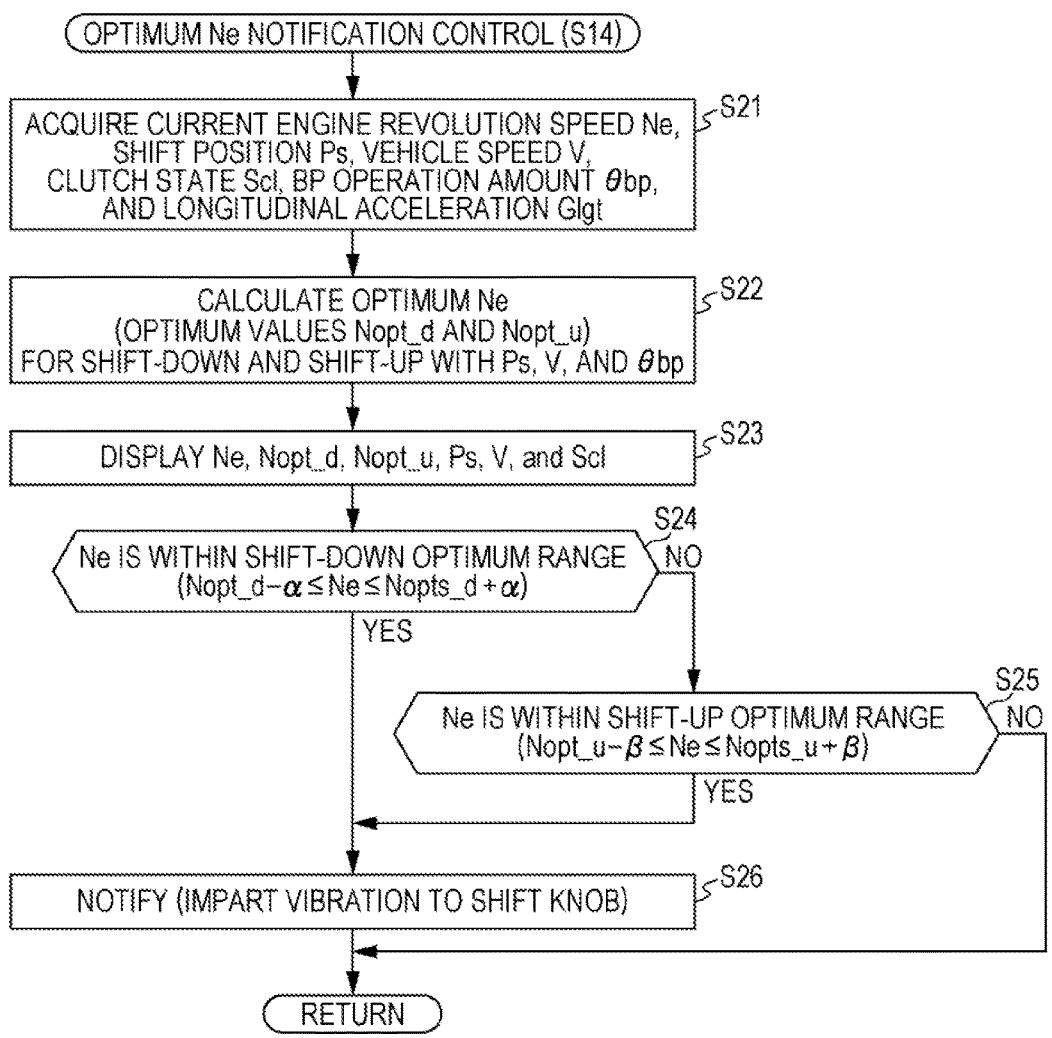
FIG. 3 is a flowchart of optimum Ne notification control (details of S14 in FIG. 2) according to the embodiment.

FIG. 3 is a flowchart of the optimum Ne notification control (details of S14 in FIG. 2) according to this embodiment. In Step S21, the practice device 20 acquires various current values in the vehicle 10. The current values here include the engine revolution speed Ne, the shift position Ps, the vehicle speed V, the clutch state Scl, the BP operation amount θbp (deceleration), and the longitudinal acceleration Glgt.

Note that the longitudinal acceleration Glgt is temporarily stored in the storage unit 104 for use in the evaluation result notification control after shift change, but is not used for notification during shift change. Therefore, the acquisition of the longitudinal acceleration Glgt can also be regarded as a part of the evaluation result notification control, rather than a part of the optimum Ne notification control.

In Step S22, the optimum Ne calculation unit 112 in the practice device 20 uses the shift position Ps, vehicle speed V, and BP operation amount θbp acquired in Step S21 to calculate optimum Ne (optimum values Nopt) for shift-down to the gear immediately below the current one and for shift-up to the gear immediately above the current one. Hereinafter, the optimum Ne for shift-down is also referred to as the optimum value Nopt_d, and the optimum Ne for shift-up is also referred to as the optimum value Nopt_u.

The optimum value Nopt is calculated by the following expression (1).

$$Nopt = \frac{Vc \times 1000 \times Rtotal}{60 \times 2\pi r} \quad (1)$$

In the expression (1), Vc is a corrected vehicle speed [km/h] obtained by correcting the vehicle speed V with the BP operation amount θbp. Rtotal is a total reduction ratio [−] in each gear stage (shift position Ps), and changes with the gear stage (shift position Ps). r is a radius [m] of the wheel 36, and 2 πr is a circumference [m] of the wheel 36. 1000 is a multiplier for converting the corrected vehicle speed Vc from kilometers to meters. 1/60 is a multiplier for converting the corrected vehicle speed Vc from kilometers per hour to kilometers per minute.

In this embodiment, the reason for using the corrected vehicle speed Vc rather than the vehicle speed V is as follows. More specifically, there is a time lag before the driver actually performs the operation after the optimum Ne is notified based on the current vehicle speed V. Therefore, the vehicle speed V changes during the time lag, and thus the optimum Ne also changes. Particularly, the shift-down is performed when the vehicle 10 is decelerating. Therefore, a change caused by the time lag can be compensated for by using the corrected vehicle speed Vc reflecting the deceleration of the vehicle 10.

In Step S23 of FIG. 3, the practice device 20 displays the engine revolution speed Ne (current value), the optimum values Nopt_d and Nopt_u, the shift position Ps, the vehicle speed V, and the clutch state Scl on the display device 16. Specific display in this event is described later with reference to FIG. 4.

In Step S24, the comparison unit 120 in the practice device 20 determines whether or not the revolution speed Ne is within the optimum range Ropt for shift-down. In order to distinguish the optimum ranges Ropt for shift-down and shift-up, hereinafter, the optimum range Ropt for shift-down is also referred to as Ropt_d, and the optimum range Ropt for shift-up is also referred to as Ropt_u.

The optimum range Ropt_d is set to a range of the sum (Nopt_d+α) of and difference (Nopt_d−α) between the optimum value Nopt_d and a positive value α. When the revolution speed Ne is within the shift-down optimum range Ropt_d (S24: YES), the processing advances to Step S26. When the revolution speed Ne is not within the shift-down optimum range Ropt_d (S24: NO), the processing advances to Step S25.

In Step S25, the comparison unit 120 in the practice device 20 determines whether or not the revolution speed Ne is within the optimum range Ropt (Ropt_u) for shift-up. The optimum range Ropt_u is set to a range of the sum (Nopt_u+β) of and difference (Nopt_u−β) between the optimum value Nopt_u and a positive value β. The value β can be the same as or different from the value α. When the revolution speed Ne is within the shift-up optimum range Ropt_u (S25: YES), the processing advances to Step S26. When the revolution speed Ne is not within the shift-up optimum range Ropt_u (S25: NO), the current optimum Ne notification control is terminated.

In Step S26, the first notification instruction unit 122 in the practice device 20 notifies the driver of the fact that the engine revolution speed Ne is within the shift-down or shift-up optimum range Ropt. In this embodiment, the vibration controller 132 in the practice device 20 activates the vibration generator 56 to impart vibration to the shift knob 60, thereby performing the notification. In addition, the first display controller 130 uses the display screen 200 in FIG. 4 to perform the notification. The display screen 200 in FIG. 4 is described below.

(A-2-2-2. Display (S23 in FIG. 3) in Optimum Ne Notification Control)

Figure 4:
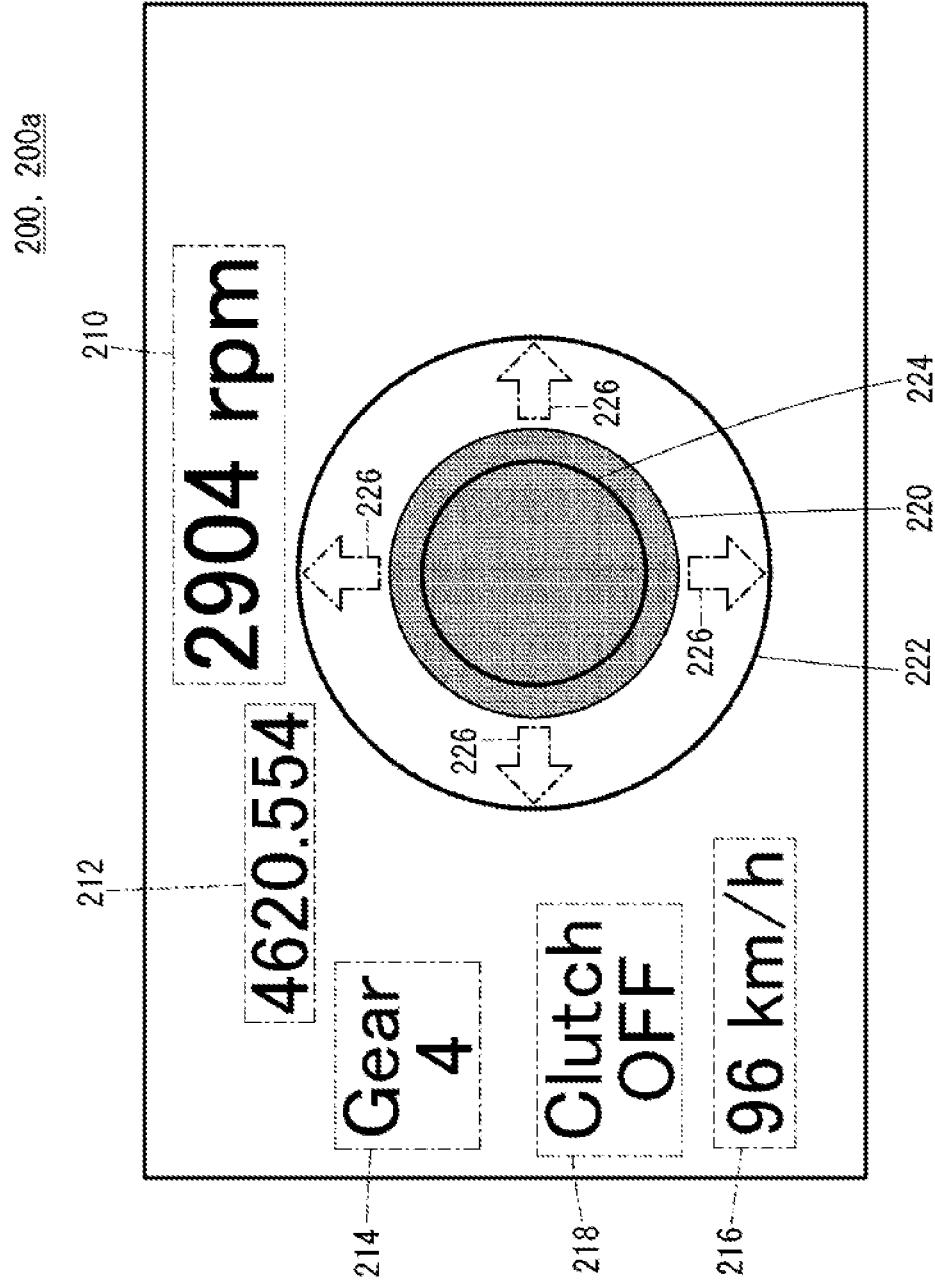
FIG. 4 is a diagram showing an example of a display screen in the optimum Ne notification control according to the embodiment.

FIG. 4 shows an example of the display screen 200 in the optimum Ne notification control according to this embodiment. In order to distinguish the display screen shown in FIG. 4 from display screens 200 shown in FIGS. 14 to 16 to be described later, the display screen 200 shown in FIG. 4 is hereinafter also referred to as the display screen 200a. As described above, in the optimum Ne notification control, the engine revolution speed Ne, the optimum values Nopt_d and Nopt_u, the shift position Ps, the vehicle speed V, and the clutch state Scl are displayed on the display device 16 (S23 in FIG. 3).

As shown in FIG. 4, the display screen 200 (hereinafter also referred to as the "screen 200") includes a revolution speed display region 210, an optimum value display region 212, a shift position display region 214, a vehicle speed display region 216, a clutch state display region 218, a revolution speed indicator 220, and optimum notification marks 222 and 224. Note that the dashed-dotted lines in FIG. 4 are virtual lines or imaginary lines, and are not displayed on the actual screen 200.

The revolution speed display region 210 is a region where the revolution speed Ne is displayed with characters. The optimum value display region 212 is a region where the shift-down optimum value Nopt_d is displayed with characters. The shift position display region 214 is a region where the shift position Ps (gear stage) is displayed with characters. The vehicle speed display region 216 is a region where the vehicle speed V is displayed with characters. The clutch state display region 218 is a region where the clutch state Scl is displayed with characters.

The revolution speed indicator 220 (hereinafter also referred to as the "indicator 220") is an image whose dimension changes according to the detected revolution speed Ne. The indicator 220 has a circular shape whose size concentrically changes according to the detected revolution speed Ne. The indicator 220 is displayed in a color (for example, white if the background is black) that is relatively easy to notice in the background. The arrows 226 in FIG. 4 represent how the indicator 220 is increased in size with an increase in the revolution speed Ne. Note that the arrows 226 are not displayed in the actual screen 200.

The optimum notification mark 222 (hereinafter also referred to as the "mark 222") has its display position change with respect to the display range of the indicator 220 according to the shift-down optimum value Nopt_d (or the optimum range Ropt_d). In this embodiment, the mark 222 is a ring mark that is arranged concentrically with the revolution speed indicator 220. The diameter of the mark 222 is increased as the optimum value Nopt_d is increased, and is reduced as the optimum value Nopt_d is reduced. The mark 222 is displayed in a color (for example, red if the background is black and the indicator 220 is white) that is easy to distinguish from the background and the indicator 220.

Likewise, the optimum notification mark 224 (hereinafter also referred to as the "mark 224") has its display position change with respect to the display range of the indicator 220 according to the shift-up optimum value Nopt_u (or the optimum range Ropt_u). In this embodiment, the mark 224 is a ring mark that is arranged concentrically with the revolution speed indicator 220. The diameter of the mark 224 is increased as the optimum value Nopt_u is increased, and is reduced as the optimum value Nopt_u is reduced. The mark 224 is displayed in a color (for example, blue if the background is black, the indicator 220 is white, and the mark 222 is red) that is easy to distinguish from the background, the indicator 220, and the mark 222.

The driver can easily check the various current values by looking at the display screen 200 as described above.

[A-2-3. Evaluation Result Notification Control]
(A-2-3-1. Overall Flow of Evaluation Result Notification Control)

Figure 5:
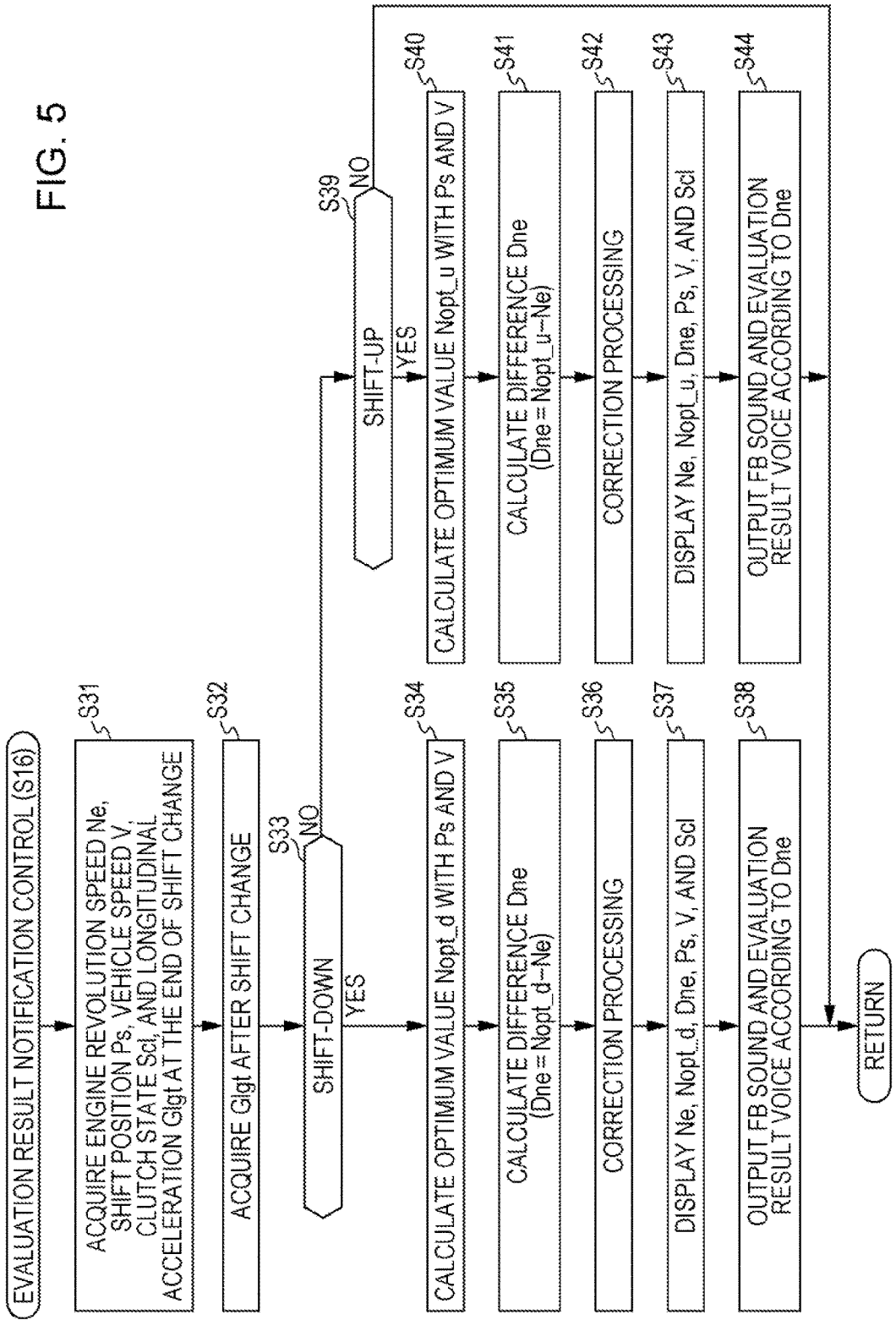
FIG. 5 is a flowchart of evaluation result notification control (details of S16 in FIG. 2) according to the embodiment.

FIG. 5 is a flowchart of the evaluation result notification control (details of S16 in FIG. 2) according to this embodiment. In Step S31, the practice device 20 acquires various values at the end of shift change. The values here include the engine revolution speed Ne, the shift position Ps, the vehicle speed V, the clutch state Scl, and the longitudinal acceleration Glgt.

In Step S32, the practice device 20 acquires the longitudinal acceleration Glgt for a predetermined period of time after the end of the shift change. As described above, the longitudinal acceleration Glgt during the shift change is also temporarily stored in the storage unit 104 (S21 in FIG. 3).

In Step S33, the shift change determination unit 110 in the practice device 20 determines whether or not the shift change finished in Step S15 of FIG. 2 is shift-down. The determination is made based on the shift positions Ps before and after the shift change. The shift change is shift-down if the shift position Ps (gear stage) after the shift change is lower than the shift position Ps before the shift change. On the other hand, the shift change is shift-up if the shift position Ps (gear stage) after the shift change is higher than the shift position Ps before the shift change. When the finished shift change is shift-down (S33: YES), the processing advances to Step S34.

In Step S34, the optimum Ne calculation unit 112 in the practice device 20 calculates the optimum value Nopt_d with the shift position Ps and the vehicle speed V at the end of shift-down. Since the values at the end of shift-down are already determined, the deceleration (BP operation amount θbp) of the vehicle 10 does not have to be taken into consideration. Therefore, the practice device 20 calculates the optimum value Nopt_d by replacing the corrected vehicle speed Vc in the above expression (1) with the vehicle speed V.

In Step S35, the difference calculation unit 140 in the practice device 20 calculates a difference Dne (Dne=Nopt_d−Ne) between the optimum value Nopt_d and the revolution speed Ne.

In Step S36, the correction processing unit 142 in the practice device 20 executes correction processing using the longitudinal acceleration Glgt. In the correction processing, the evaluation result is corrected according to the magnitude of impact (here, the longitudinal acceleration Glgt) associated with reconnection of the clutch 40 for shift change (here, shift-down). The correction processing is described in detail later with reference to FIGS. 6 to 8.

In Step S37, the second display controller 150 in the practice device 20 displays the revolution speed Ne, the optimum value Nopt_d, the difference Dne, the shift position Ps, the vehicle speed V, and the clutch state Scl on the display device 16. Specific display in this event is described later with reference to FIGS. 9 to 11.

In Step S38, the FB sound controller 152 in the practice device 20 outputs a feedback sound (FB sound) and a voice (evaluation result voice) that explains the evaluation result from the speaker 18 according to the difference Dne. The output of the FB sound is described later with reference to FIG. 12. When the difference Dne is a negative value (deficiency), the evaluation result voice notifies to the effect that pressing down on the accelerator pedal 30 is not enough or that the timing of pressing down on the accelerator pedal 30 is late. On the other hand, when the difference Dne is a positive value (excess), the evaluation result voice notifies to the effect that pressing down on the accelerator pedal 30 is too much.

Back to Step S33, when the finished shift change is not shift-down (S33: NO), the processing advances to Step S39.

In Step S39, the shift change determination unit 110 determines whether or not the shift change finished in Step S15 of FIG. 2 is shift-up. As in the case of Step S33, the determination is made based on the shift positions Ps before and after the shift change.

When the finished shift change is shift-up (S39: YES), the processing advances to Step S40. When the finished shift change is not shift-up (S39: NO), no shift change is made (the gear stage is returned to the original shift position Ps) even though the clutch 40 is disconnected. In this case, the current evaluation result notification control is terminated.

In Step S40, the optimum Ne calculation unit 112 in the practice device 20 calculates the optimum value Nopt_u with the shift position Ps and the vehicle speed V at the end of shift-up. The calculation of the optimum value Nopt_u is the same as the calculation of the optimum value Nopt_d (S34).

In Step S41, the difference calculation unit 140 in the practice device 20 calculates a difference Dne (Dne=Nopt_u−Ne) between the optimum value Nopt_u and the revolution speed Ne.

In Step S42, the correction processing unit 142 in the practice device 20 executes correction processing using the longitudinal acceleration Glgt. In the correction processing, the evaluation result is corrected according to the magnitude of impact (here, the longitudinal acceleration Glgt) associated with reconnection of the clutch 40 for shift change (here, shift-up). The correction processing is described in detail later with reference to FIG. 6 and the like.

In Step S43, the second display controller 150 in the practice device 20 displays the revolution speed Ne, the optimum value Nopt_u, the difference Dne, the shift position Ps, the vehicle speed V, and the clutch state Scl on the display device 16.

In Step S44, the FB sound controller 152 in the practice device 20 outputs a feedback sound (FB sound) from the speaker 18 according to the difference Dne. The output of the FB sound is described later with reference to FIG. 12.
(A-2-3-2. Correction Processing (S36 and S42 in FIG. 5))
(A-2-3-2-1. Premise and Overview of Correction Processing)

In the correction processing, the evaluation result is corrected according to the magnitude of impact (here, the longitudinal acceleration Glgt) associated with reconnection of the clutch 40 for shift change. As described above, in this embodiment, the determination on the end of the shift change is made on the connection state of the clutch 40. When the clutch 40 is switched from OFF (unconnected state) to ON (connected state), the difference Dne is calculated (S35 and S41 in FIG. 5).

Here, even if the difference Dne when the clutch 40 is switched from OFF to ON is large, there is a case where the impact associated with reconnection of the clutch can be suppressed by use of a half-clutch operation. In such a case, such an operation may be evaluated as sufficient as a shift change operation, from the viewpoint of ride quality for passengers (including the driver).

Therefore, in the correction processing according to this embodiment, the evaluation result is corrected so as to give a good evaluation if the impact associated with reconnection of the clutch 40 is suppressed even when the difference Dne is large.
(A-2-3-2-2. Overview of Correction Processing Flow)

Figure 6:
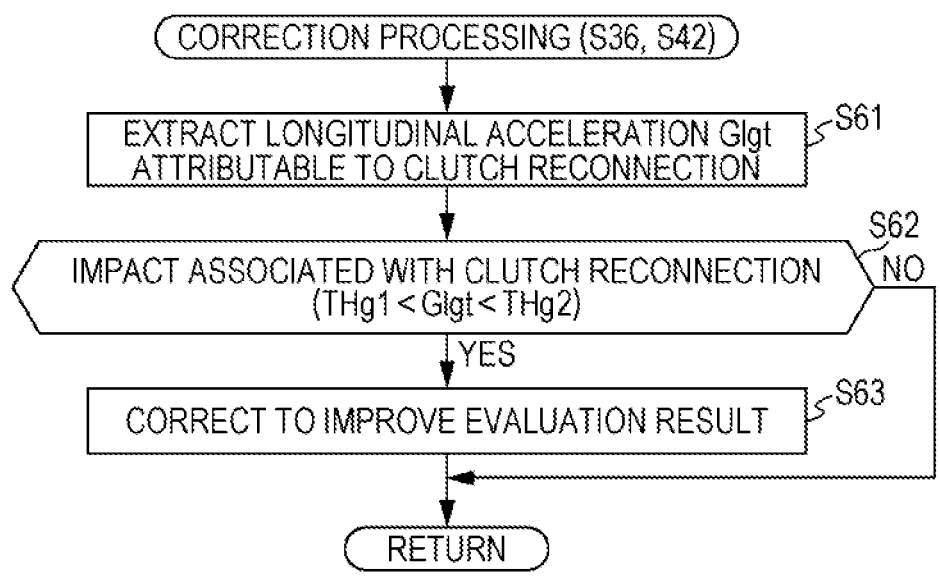
FIG. 6 is a flowchart of correction processing (details of S36 and S42 in FIG. 5) according to the embodiment.
Figure 8:
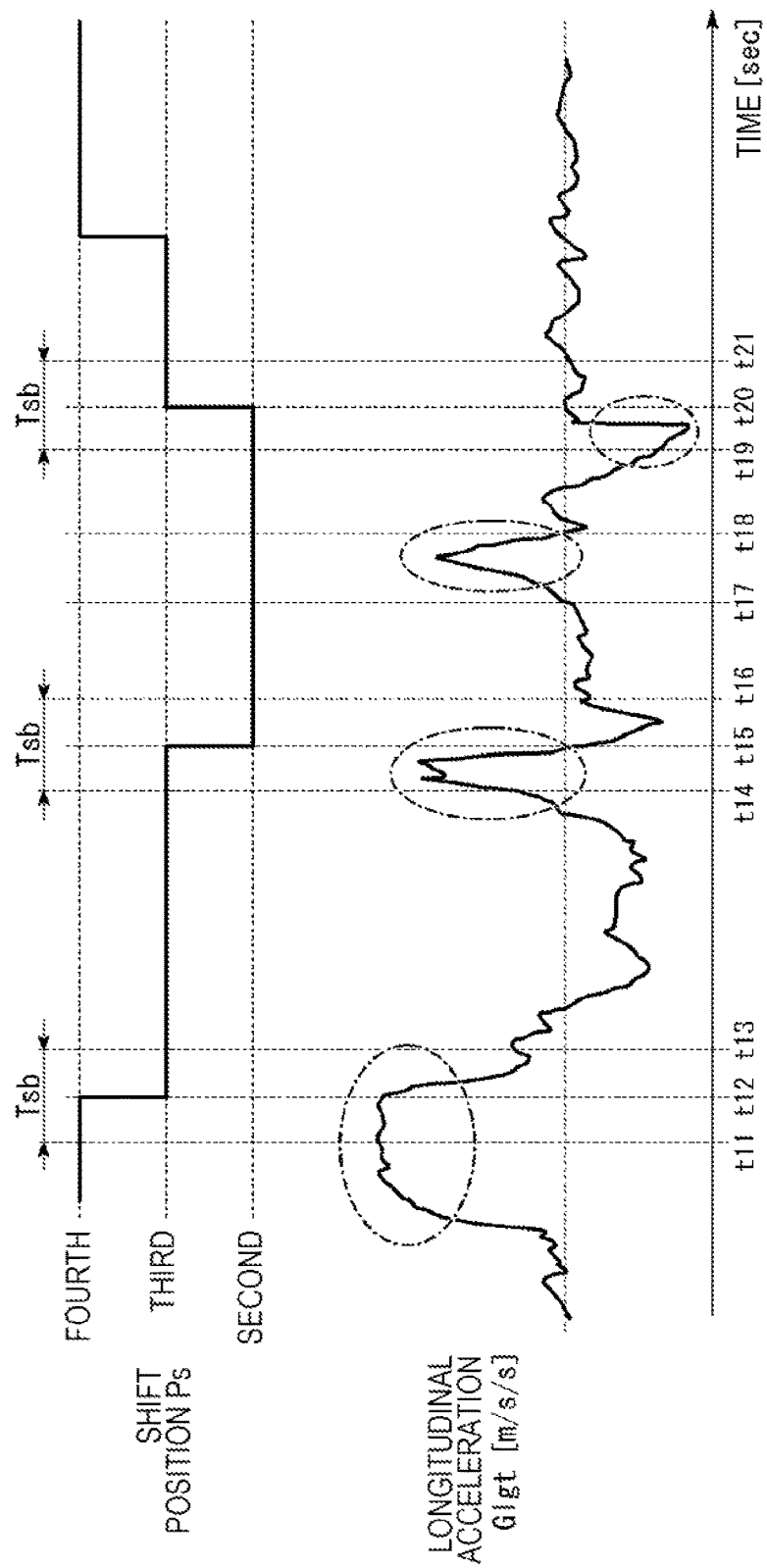
FIG. 8 is a diagram for explaining a method for extracting a longitudinal acceleration attributable to reconnection of a clutch according to the embodiment.

FIG. 6 is a flowchart of the correction processing (details of S36 and S42 in FIG. 5) according to this embodiment. In Step S61 of FIG. 6, the practice device 20 extracts the longitudinal acceleration Glgt attributable to reconnection of the clutch 40 from the longitudinal acceleration Glgt (S21 in FIG. 3) acquired during the shift change and the longitudinal acceleration Glgt (S31 and S32 in FIG. 5) acquired after the shift change. With reference to FIG. 8, description is given later of a method for extracting the longitudinal acceleration Glgt attributable to reconnection of the clutch 40 by the practice device 20.

In Step S62, the practice device 20 determines whether or not the impact associated with reconnection of the clutch 40 is small. To be more specific, the practice device 20 determines whether or not the longitudinal acceleration Glgt is larger than a negative first acceleration threshold THg1 and smaller than a positive second acceleration threshold THg2. The minimum value of the longitudinal acceleration Glgt is used for comparison with the negative first acceleration threshold THg1. The maximum value of the longitudinal acceleration Glgt is used for comparison with the positive second acceleration threshold THg2.

When the impact attributable to reconnection of the clutch 40 is small (S62: YES), the practice device 20 performs correction so as to relatively improve the evaluation result in Step S63. For example, the practice device 20 multiplies the difference Dne by a positive constant of less than 1. Alternatively, the practice device 20 may configure the settings in Step S37 and S43 in FIG. 5 to notify to the effect that the vehicle 10 has excellent ride quality, without changing the difference Dne.

Note that the practice device 20 can also be configured to multiply the difference Dne by a positive coefficient or to add the positive coefficient to the difference Dne according to one of or both of the minimum value and the maximum value of the longitudinal acceleration Glgt, instead of Steps S62 and S63. In this case, the settings are configured such that the larger the minimum value of the longitudinal acceleration Glgt (closer to the average) or the smaller the maximum value of the longitudinal acceleration Glgt (closer to the average), the better the evaluation.

Figure 7:
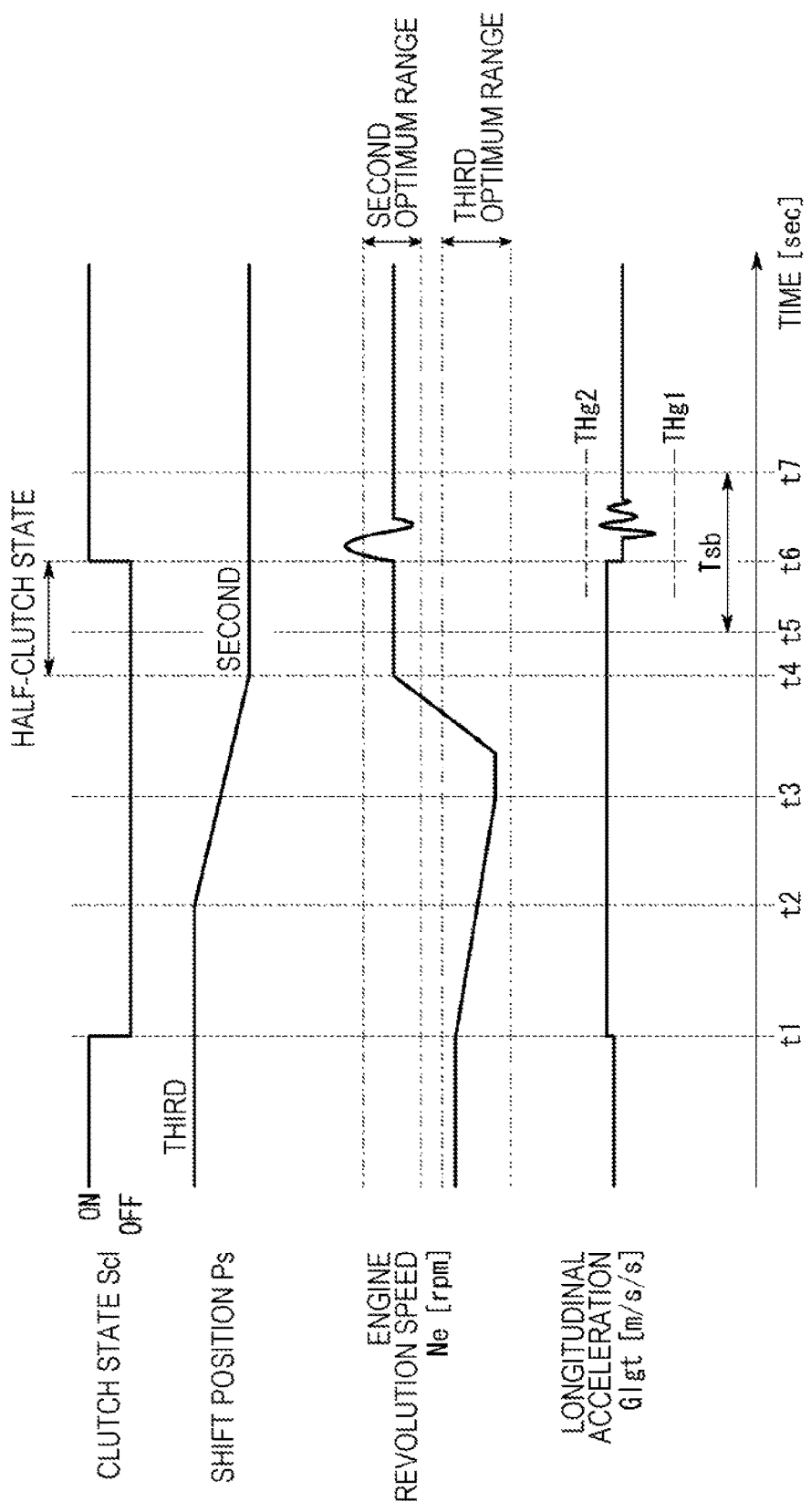
FIG. 7 is a time chart for explaining the correction processing according to the embodiment.

FIG. 7 is a time chart for explaining the correction processing according to this embodiment. The vertical axis of FIG. 7 represents the clutch state Scl, the shift position Ps, the engine revolution speed Ne, and the longitudinal acceleration Glgt, while the horizontal axis thereof represents time.

In FIG. 7, at a time point t1, the clutch state Scl is switched from ON (connected state) to OFF (unconnected state) and shift-down is started. Then, at a time point t6, the clutch state Scl is switched from OFF (unconnected state) to ON (connected state) and shift-down is finished.

Between a time point t2 to a time point t4, the shift position Ps is switched from third to second. At a time point t3 therebetween, the driver starts pressing down on the accelerator pedal 30, and the time differential value of the revolution speed Ne is increased. Also, the half-clutch state is set between the time points t4 and t6, in which the clutch 40 is not reconnected even though the shift position Ps is already switched. When the clutch 40 is reconnected at the time point t6, the engine revolution speed Ne is accordingly increased and deviates from the optimum range Ropt_d for second.

The practice device 20 extracts the longitudinal acceleration Glgt for a predetermined period of time Tsb (time points t5 to t7) before and after the time point t6 of the reconnection (a part of S61 in FIG. 6). Since the half-clutch operation is appropriate during the predetermined period of time Tsb, the longitudinal acceleration Glgt is within the range of the thresholds THg1 and THg2 (S62 in FIG. 6: YES). Thus, the practice device 20 performs correction so as to improve the evaluation result (S63 in FIG. 6).

(A-2-3-2-3. Method for Extracting Longitudinal Acceleration Glgt attributable to Reconnection of Clutch 40)

FIG. 8 is a diagram for explaining a method for extracting the longitudinal acceleration Glgt attributable to reconnection of the clutch 40 (S61 in FIG. 6) according to this embodiment. In FIG. 8, the vertical axis represents the shift position Ps and the longitudinal acceleration Glgt, while the horizontal axis represents time. Also, the dashed-dotted lines in FIG. 8 indicate portions with a relatively large change in the longitudinal acceleration Glgt.

In this embodiment, it is determined whether or not a change in the longitudinal acceleration Glgt is attributable to the reconnection of the clutch 40 for the predetermined period of time Tsb around time points (for example, time points t12, t15, and t20) where the shift position Ps is changed. In FIG. 8, time points t11 to t13, t14 to t16, t19 to t21 correspond to the predetermined period of time Tsb. Therefore, a change in the longitudinal acceleration Glgt at other time points (for example, time points t17 to t18) is excluded.

Moreover, when the longitudinal acceleration Glgt changes due to the reconnection of the clutch 40, such a change occurs in a relatively short period of time. Therefore, in this embodiment, when the absolute value of a difference between a peak value and a start value within the predetermined period of time Tsb and the absolute value of a difference between the peak value and an end value are not less than a predetermined value, a change in the longitudinal acceleration Glgt is determined to be attributable to the reconnection of the clutch 40.

Therefore, in the example of FIG. 8, changes within the time points t14 to t16 and t19 to t21 are determined to be attributable to the reconnection of the clutch 40. On the other hand, a change in the longitudinal acceleration Glgt within the time points t11 to t13 is not determined to be attributable to the reconnection of the clutch 40.

Through such processing as described above, the practice device 20 extracts the longitudinal acceleration Glgt attributable to the reconnection of the clutch 40.

(A-2-3-3. Display (S37 and S43 in FIG. 5) in Evaluation Result Notification Control)

Figure 9:
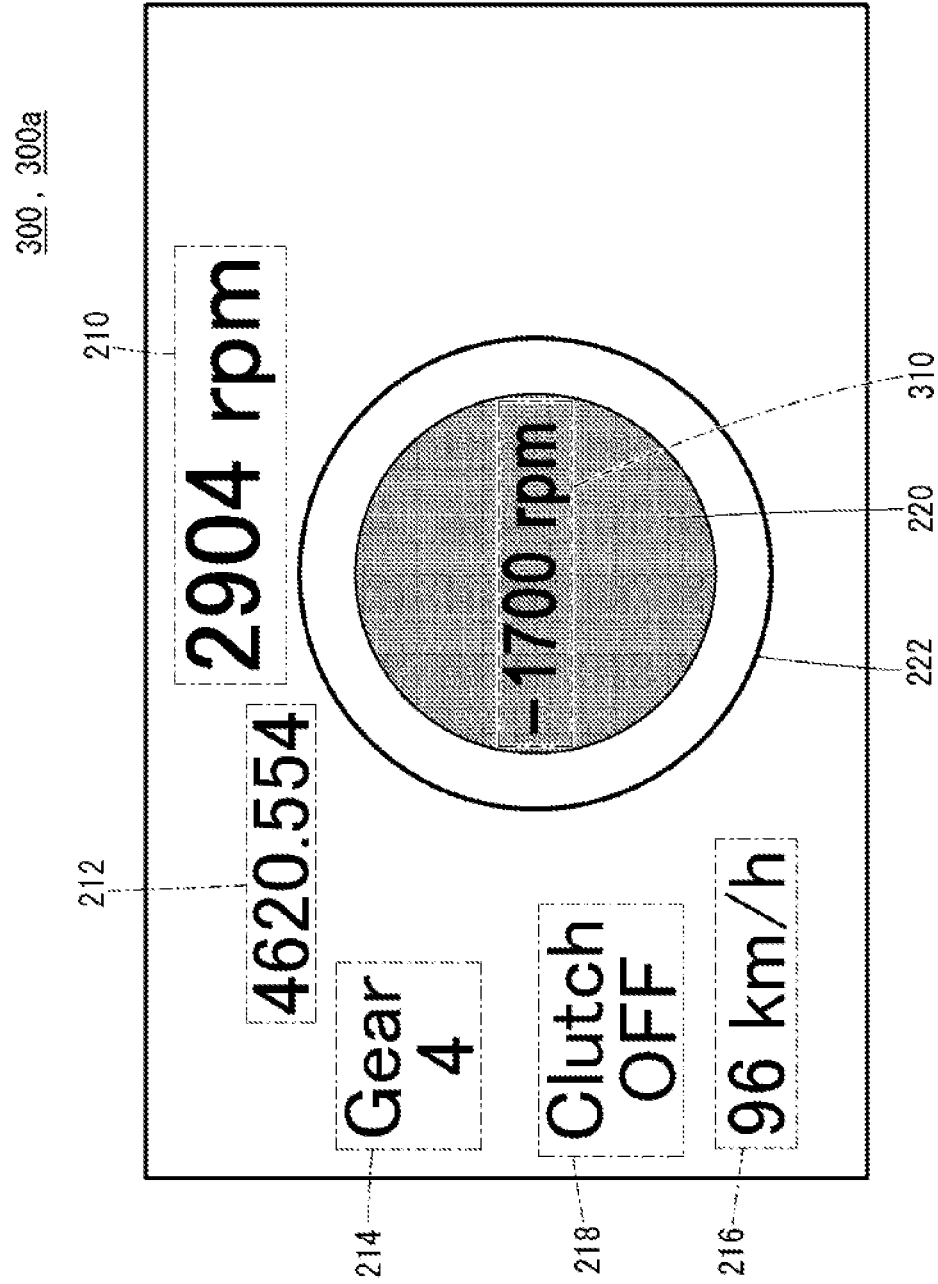
FIG. 9 is a diagram showing a first example of a display screen in the evaluation result notification control according to the embodiment.
Figure 10:
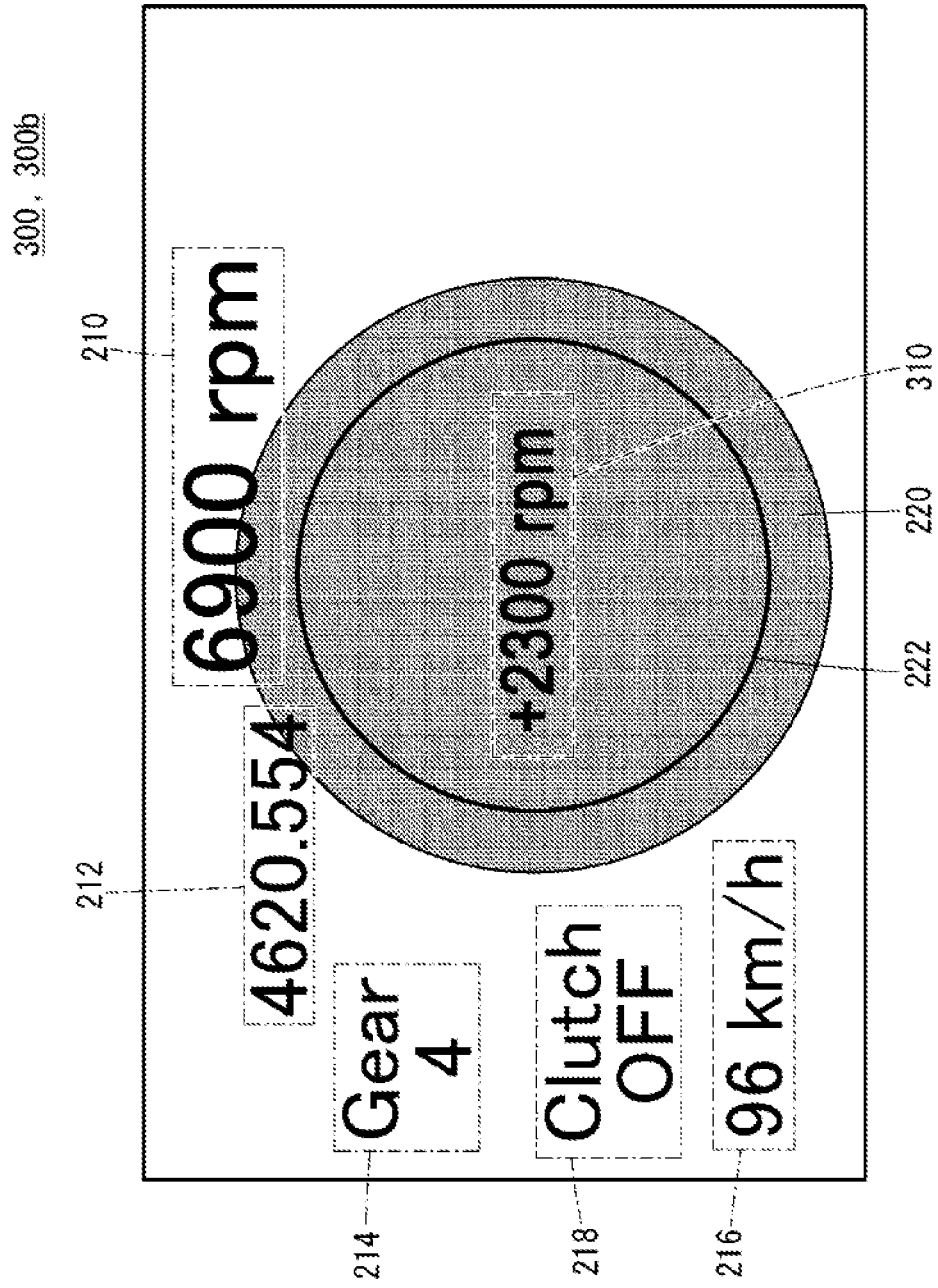
FIG. 10 is a diagram showing a second example of a display screen in the evaluation result notification control according to the embodiment.
Figure 11:
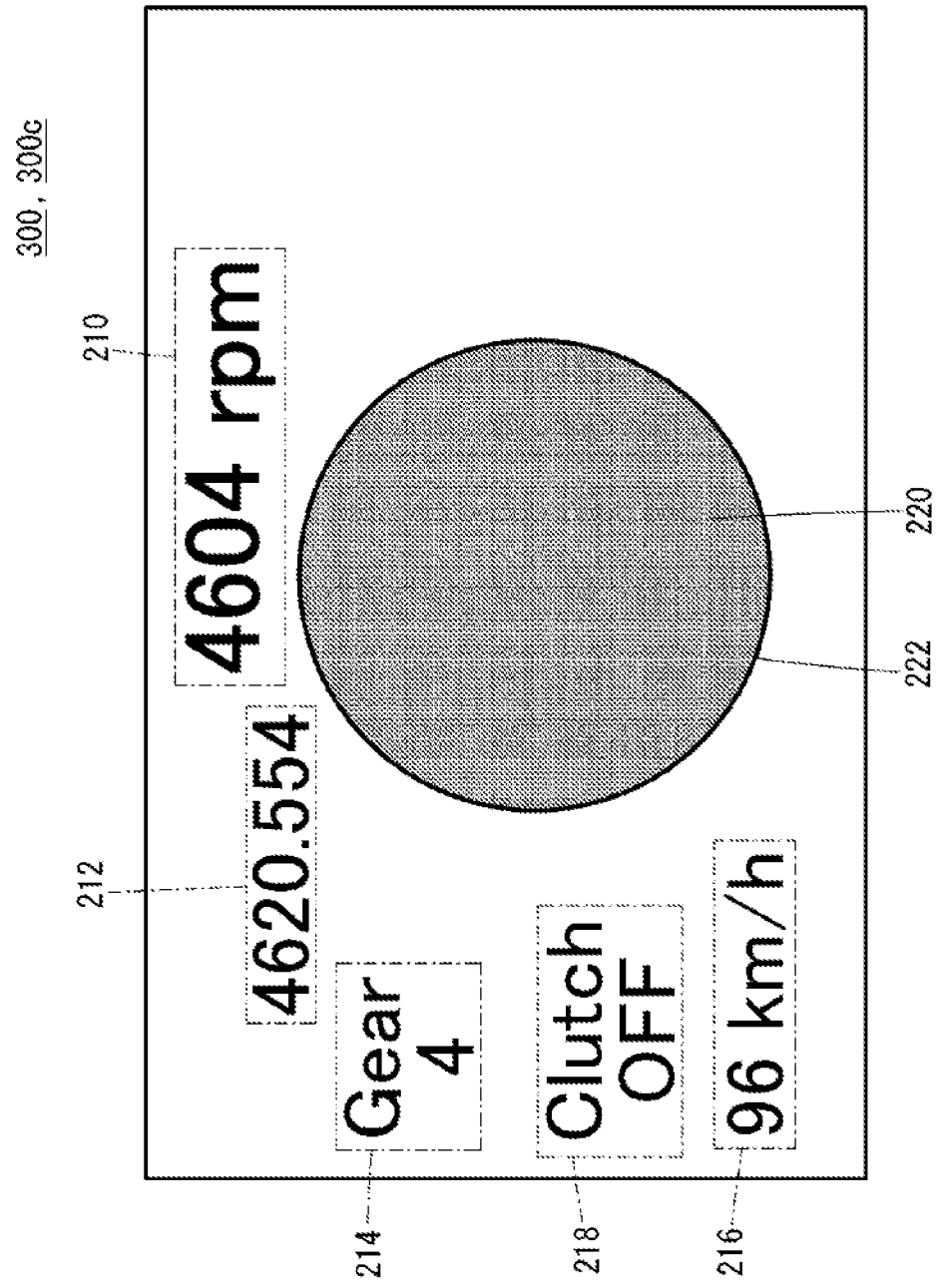
FIG. 11 is a diagram showing a third example of a display screen in the evaluation result notification control according to the embodiment.

FIGS. 9 to 11 show first to third examples of a display screen 300 in the evaluation result notification control according to this embodiment. The display screens 300 shown in FIGS. 9 to 11 are also referred to as the display screens 300a to 300c, respectively.

As described above, in the evaluation result notification control, the engine revolution speed Ne, the optimum value Nopt (Nopt_d or Nopt_u), the difference Dne, the shift position Ps, the vehicle speed V, and the clutch state Scl are displayed on the display device 16 (S37 and S43 in FIG. 5). The same constituent components as those in the display screen 200 (FIG. 4) in the optimum Ne notification control are denoted by the same reference numerals, and detailed description thereof is omitted.

On the display screen 200 (FIG. 4) in the optimum Ne notification control, both of the optimum notification mark 222 for shift-down and the optimum notification mark 224 for shift-up are displayed. On the other hand, on the display screen 300 (FIGS. 9 to 11) in the evaluation result notification control, only the optimum notification mark 222 corresponding to the actually performed shift change (shift-down or shift-up) is displayed. In the case of FIGS. 9 to 11, the optimum notification mark 222 for shift-down is displayed, while the optimum notification mark 224 (FIG. 4) for shift-up is not displayed. Moreover, when the shift-up is performed, the shift-up optimum value Nopt_u is displayed in the optimum value display region 212.

Furthermore, as shown in FIGS. 9 and 10, a difference display region 310 for displaying the difference Dne is provided in each of the display screens 300a and 300b in the evaluation result notification control. In this embodiment, the difference display region 310 is disposed in a position corresponding to the revolution speed indicator 220. Note that, as shown in FIG. 11, the difference Dne is not displayed when the absolute value of the difference Dne is not more than a predetermined threshold (difference threshold). Alternatively, the difference Dne may be displayed also in the case of FIG. 11.

(A-2-3-4. Output of FB Sound (S38 and S44 in FIG. 5))

Figure 12:
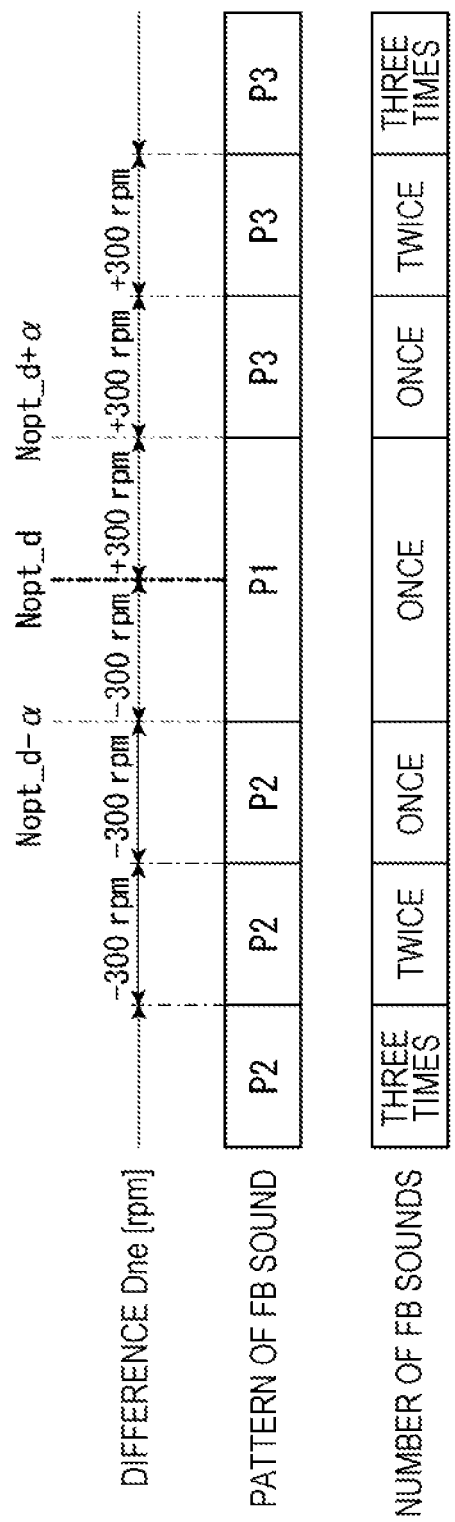
FIG. 12 is a diagram for explaining a method for setting a feedback (FB) sound according to the embodiment.

FIG. 12 is a diagram for explaining a method for setting an FB sound according to this embodiment. Although FIG. 12 shows a case of shift-down, the same goes for a case of shift-up. As shown in FIG. 12, patterns (kinds) and the number of FB sounds are set according to the difference Dne.

To be more specific, when the difference Dne is within the optimum range Ropt (Ropt_d), the FB sound controller 152 outputs one long sound (pattern P1) that evokes a sense of successful shift-down. On the other hand, when the difference Dne (=Nopt−Ne) is a negative value (that is, when the revolution speed Ne is not enough), a short sound of a pattern P2 is outputted. When the difference Dne is a positive value (that is, when the revolution speed Ne is excessive), a short sound of a pattern P3 is outputted. The short sounds of the patterns P2 and P3 have different pitches. For example, the short sound of the pattern P2 is lower (or higher) pitched than the short sound of the pattern P3.

In either case of the patterns P2 and P3, the number of the FB sounds is increased as the difference Dne deviates from the optimum value Nopt_d or the optimum range Ropt. Note that, in FIG. 12, the pattern and the number of the FB sounds are changed for every 300 rpm of the difference Dne. However, the threshold of the difference Dne is not limited thereto. For example, the threshold of the difference Dne may be set so as to classify the evaluation results on the difference Dne into three grades ("Excellent", "Good", and "Bad"). Alternatively, the threshold of the difference Dne may be automatically changed such that the evaluation gets stricter as the driver (user) becomes more skilled. The threshold of the difference Dne here may be changed or inputted by the user.

Moreover, as described later, the FB sound can be set by another setting method (output method).

<A-3. Effects of Embodiment>

As described above, according to this embodiment, when the detected revolution speed Ne is included in the optimum range Ropt (S24: YES or S25: YES in FIG. 3) in a state where the clutch 40 is disconnected for a shift change (S13: YES in FIG. 2), the display device 16 and the vibration generator 56 (notification device) are instructed to give a predetermined notification to the driver (S26). As a result, the display device 16 and the vibration generator 56 give the predetermined notification. Thus, the driver can learn, from the notification given by the display device 16 and the vibration generator 56, the optimum range Ropt during a shift change without determining himself/herself the relationship between the detected revolution speed Ne (current value) and the optimum range Ropt before reconnection of the clutch 40. Therefore, the effect of learning the shift change operation can be enhanced.

In this embodiment, when the detected revolution speed Ne is included in the optimum range Ropt (S24: YES or S25: YES in FIG. 3), the first notification instruction unit 122 (FIG. 1) instructs the vibration generator 56 for the shift knob 60 to generate vibration (S26). As a result, the vibration generator 56 generates vibration in the shift knob 60. Thus, the driver can learn, through the vibration in the shift knob 60, the optimum range Ropt of the engine revolution speed Ne during the shift change without looking at the display device 16 such as a meter.

According to this embodiment, when a shift change is performed (S15: YES in FIG. 2), the display device 16 and the speaker 18 (notification device) are instructed to give a notification indicating the difference Dne between the detected revolution speed Ne and the optimum value Nopt or the optimum range Ropt (S37, S38, S43, and S44 in FIG. 5). As a result, the display device 16 and the vibration generator 56 give the notification indicating the difference Dne (FIGS. 9 to 12). Thus, the driver can recognize the difference Dne immediately after the shift change without determining himself/herself the difference Dne during the shift change. Therefore, the effect of learning the shift change operation can be enhanced.

In this embodiment, the second notification instruction unit 144 (FIG. 1) instructs the speaker 18 to output FB sounds (short sounds), the number of which corresponds to the difference Dne (S38 and S44 in FIG. 5 and FIG. 12). Thus, the driver can easily recognize the difference Dne between the detected revolution speed Ne and the optimum value Nopt or the optimum range Ropt, by referring to the number of the FB sounds.

In this embodiment, the second notification instruction unit 144 (FIG. 1) changes the pitch of the FB sound (short sound) according to the positive or negative sign of the difference Dne (FIG. 12). Thus, the driver can easily recognize whether the detected revolution speed Ne during the shift change is excessive or insufficient.

In this embodiment, the second notification instruction unit 144 (FIG. 1) instructs the display device 16 to display the evaluation result corresponding to the difference Dne for a predetermined period of time (for example, between 1.0 to 2.0 seconds) (S38 and S44 in FIG. 5). Thus, the driver can confirm a specific meaning of the difference Dne.

In this embodiment, the practice device 20 includes the correction processing unit 142 (correction unit) that corrects the evaluation result according to the magnitude of impact (longitudinal acceleration Glgt) associated with reconnection of the clutch 40 for a shift change (FIGS. 1 and 6). Even if there is a large difference Dne between the detected revolution speed Ne and the optimum value Nopt or the optimum range Ropt, there is a case where evaluation can be made that an appropriate shift change operation is performed, depending on a method for using half-clutch. Therefore, the shift change operation can be evaluated from diverse points of view by correcting the evaluation result according to the magnitude of impact associated with the reconnection of the clutch 40.

In this embodiment, the correction processing unit 142 (correction unit) corrects the evaluation result only after the end of the shift change (in other words, only during a predetermined period after the start of the shift change operation) (S16 in FIG. 2 and S36 and S42 in FIG. 5). Thus, the reliability of the evaluation result can be improved by eliminating the impact unrelated to the shift change operation.

In this embodiment, the optimum speed calculation unit 112 corrects the optimum value Nopt corresponding to the vehicle speed V based on the BP operation amount θbp (deceleration) (S22 in FIG. 3). Thus, the driver can learn a more appropriate optimum value Nopt or optimum range Ropt by using the optimum value Nopt or the optimum range Ropt corresponding to the engine revolution speed Ne when the clutch 40 is actually reconnected at a time point shortly after the current time point.

In this embodiment, the practice device 20 includes the first display controller 130 and the second display controller 150 that display the revolution speed indicator 220 whose dimension changes according to the detected revolution speed Ne and the optimum notification marks 222 and 224, each having its display position change with respect to the display range of the indicator 220 according to the optimum value Nopt_d or the optimum range Ropt (FIGS. 1, 4, 9, 10, and 11). Thus, the driver can easily visually recognize the relationship between the detected revolution speed Ne and the optimum value Nopt or the optimum range Ropt in the event of a shift change.

In this embodiment, the revolution speed indicator 220 has a circular shape whose size concentrically changes according to the detected revolution speed Ne, and each of the optimum notification marks 222 and 224 is a ring mark that is arranged concentrically with the revolution speed indicator 220 (FIGS. 4, 9, 10, and 11). Thus, the driver can more easily visually recognize the relationship between the detected revolution speed Ne and the optimum value Nopt or the optimum range Ropt in the event of a shift change.

B. Application of Present Disclosure

Note that the present disclosure is not limited to the above embodiment, but various configurations can be adopted based on the contents described in the present specification, as a matter of course. For example, the following configurations can be adopted.

<B-1. Application Target>

In the above embodiment, the shift change practice device 20 is applied to the vehicle 10 (FIG. 1). However, the application target is not limited to the vehicle 10 as long as the target is a device that requires practice of a shift change operation. For example, the practice device 20 can also be applied to a mobile object such as a ship or an aircraft.

<B-2. Clutch State Scl>

In the above embodiment, the clutch state Scl is acquired from the clutch sensor 52 (FIG. 1). However, a method for acquiring the clutch state Scl is not limited thereto. For example, the shift change determination unit 110 (disconnection estimation unit) in the practice device 20 can also estimate the clutch state Scl from both of or one of the engine torque Teng and the engine revolution speed Ne.

Figure 13:
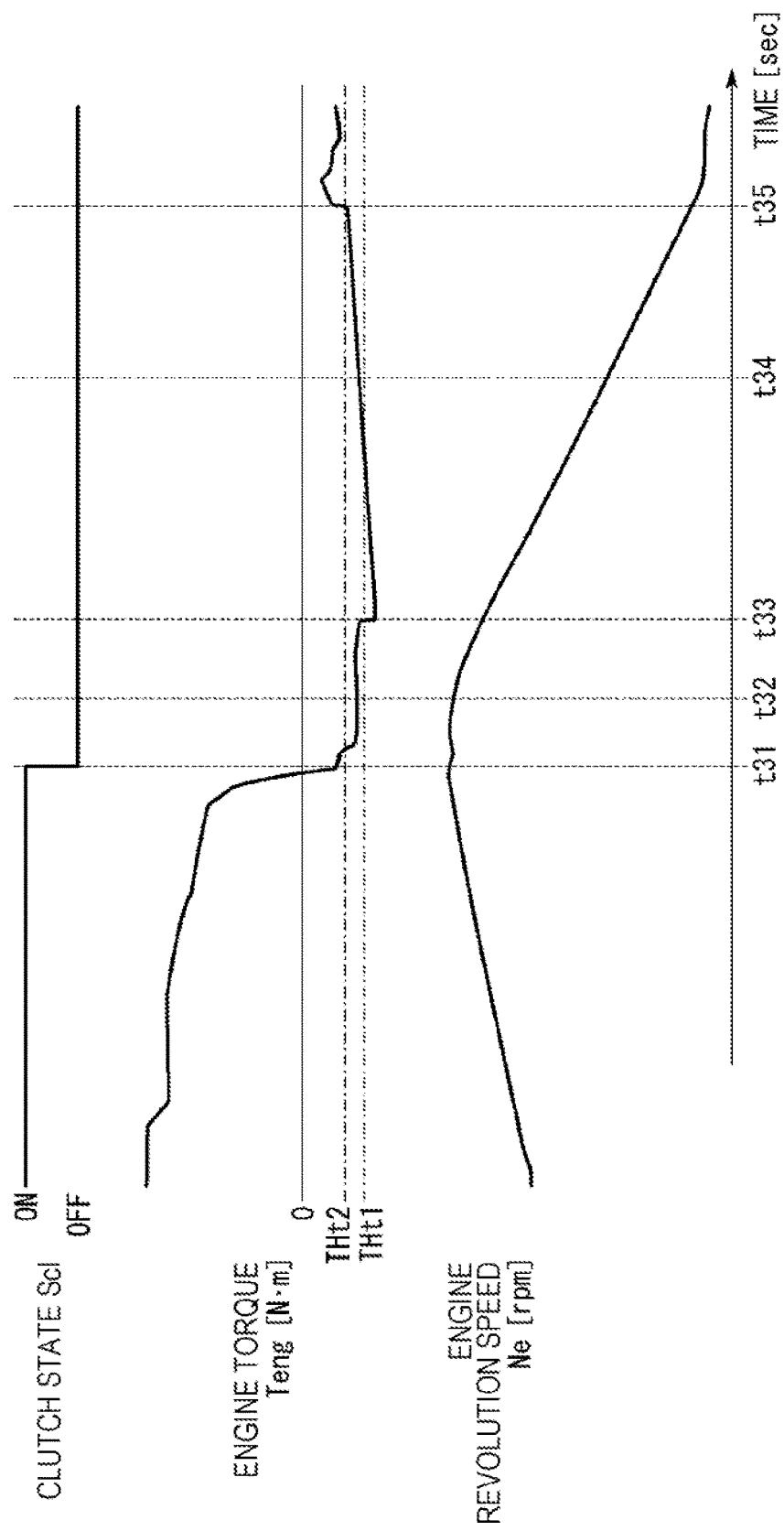
FIG. 13 is a diagram for explaining a method for estimating a clutch state.

FIG. 13 is a diagram for explaining a method for estimating the clutch state Scl. In FIG. 13, the vertical axis represents the clutch state Scl, the engine torque Teng, and the engine revolution speed Ne, while the horizontal axis represents time. At a time point t31, the clutch state Scl is switched from ON (connected state) to OFF (unconnected state).

Accordingly, the engine torque Teng reaches a negative value beyond zero and then gradually increases to zero after reaching the lowest value at a time point t33. The use of such movement of the engine torque Teng makes it possible to estimate that the clutch state Scl is switched from ON (connected state) to OFF (unconnected state). For example, when the engine torque Teng reaches a negative first torque threshold THt1 or below and then reaches a second torque threshold THt2 or above around zero (t35), the shift change determination unit 110 (clutch state estimation unit) in the practice device 20 may estimate that the clutch state Scl is switched from ON (connected state) to OFF (unconnected state).

Also, when the clutch state Scl is switched from ON (connected state) to OFF (unconnected state) at the time point t31, the engine revolution speed Ne drops rapidly. The shift change determination unit 110 can use such movement of the revolution speed Ne to determine that the clutch state Scl is switched from ON (connected state) to OFF (unconnected state).

For example, when a rotational acceleration $\Delta$Ne [rpm/s] that is a time differential value of the revolution speed Ne reaches a negative acceleration threshold TH$\Delta$ne or below, the shift change determination unit 110 may determine that the clutch state Scl is switched from ON (connected state) to OFF (unconnected state). In this event, the determination is confirmed when a time T$\Delta$ne for which the rotational acceleration $\Delta$Ne is equal to or smaller than the acceleration threshold TH$\Delta$ne reaches a time threshold THt$\Delta$ne or above (for example, time points t32 to t34 in FIG. 13).

With the above method, when to start a shift change can be determined even when a signal (clutch signal) indicating the connection state of the clutch 40 (clutch state Scl) cannot be used due to specifications or failure.

For estimation of switch from OFF (unconnected state) to ON (connected state), a change in both of or one of the engine torque Teng and the engine revolution speed Ne due to the switch from OFF to ON can be used, for example, as in the case of the above. For example, when the engine torque Teng exceeds a positive torque threshold or when the revolution speed Ne exceeds a positive revolution speed threshold THne, it can be estimated that the clutch state Scl is switched from OFF to ON.

Alternatively, the shift change determination unit 110 (disconnection estimation unit) in the practice device 20 may estimate that the clutch 40 is set in the unconnected state when an increase or decrease in the engine revolution speed Ne does not correspond to an increase or decrease in the vehicle speed V. More specifically, once the clutch 40 is set in the unconnected state, the vehicle speed V is decreased by rolling resistance (frictional resistance) or the like, even when the engine revolution speed Ne is increased.

Therefore, the determination unit 110 identifies a combination of a change in the engine revolution speed Ne (rotational acceleration $\Delta$Ne) per unit time and a change in the vehicle speed V (vehicle acceleration $\Delta$V) per unit time. Then, the determination unit 110 estimates that the clutch 40 is set in the unconnected state, when the combination of the rotational acceleration $\Delta$Ne and the vehicle acceleration $\Delta$V indicates the unconnected state (OFF) of the clutch 40. Thereafter, the determination unit 110 estimates that the clutch 40 is set back to the connected state from the unconnected state, when the combination of the rotational acceleration $\Delta$Ne and the vehicle acceleration $\Delta$V indicates the connected state (ON) of the clutch 40.

Thus, as in the case of FIG. 13, when to start and end a shift change can be determined even when a signal (clutch signal) indicating the connection state of the clutch 40 (clutch state Scl) cannot be used due to specifications or failure.

<B-3. Optimum Ne Notification Control>
[B-3-1. Target Shift Change Operation]

In the optimum Ne notification control according to the above embodiment, both of the shift-down operation and the shift-up operation are practiced (FIG. 3 and the like). However, any one of the shift-down operation and the shift-up operation may be practiced.

[B-3-2. BP Operation Amount $\theta$bp (Deceleration)]

In the optimum Ne notification control according to the above embodiment, the BP operation amount $\theta$bp is used to reflect the deceleration of the vehicle 10 on the optimum Ne (S22 in FIG. 3). However, the embodiment is not limited thereto in terms of calculating the optimum Ne at the timing of reconnection of the clutch 40, for example. For example, a time differential value of the vehicle speed V (vehicle acceleration) may be reflected as the deceleration on the optimum Ne. Alternatively, the force on the brake pedal 80, which is detected by a pressure sensor or the like, may also be reflected as the deceleration on the optimum Ne. As the pressure sensor here, one connected to the brake pedal 80, one that detects a hydraulic pressure of the brake mechanism 82, or the like can be used.

[B-3-3. Notification]

In the optimum Ne notification control according to the above embodiment, the optimum Ne is displayed on the display device 16 (FIG. 4) and vibration is generated in the shift knob 60 (S26 in FIG. 3). However, the embodiment is not limited thereto in terms of giving a predetermined notification to the driver when the revolution speed Ne is equal to the optimum value Nopt or the revolution speed Ne is included in the optimum range Ropt in a state where the clutch 40 is disconnected, for example.

[B-3-4. Display Screen 200]

Although the display screen 200a shown in FIG. 4 is used in the optimum Ne notification control according to the above embodiment, other display screens can also be used.

Figure 14:
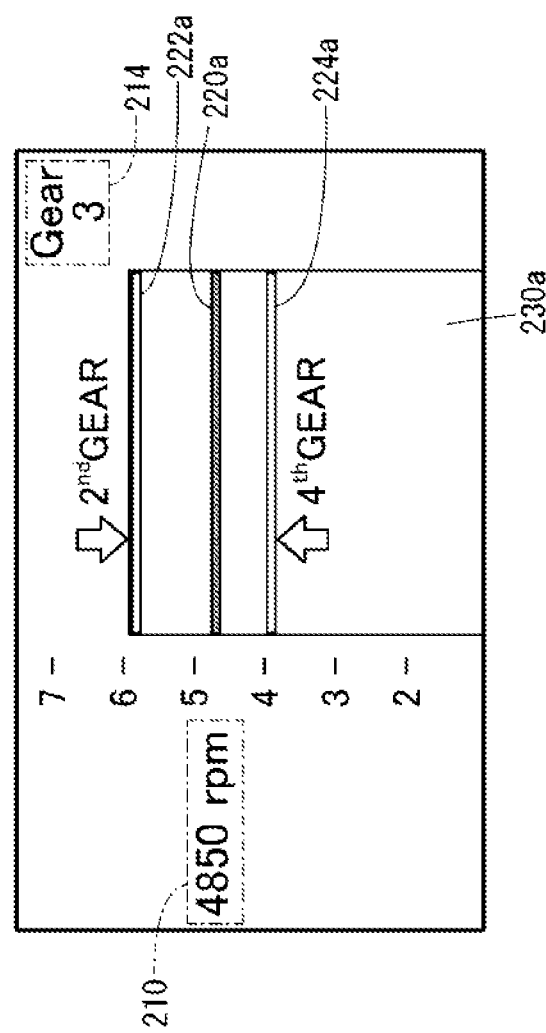
FIG. 14 is a diagram showing a display screen according to a first modified example.
Figure 15:
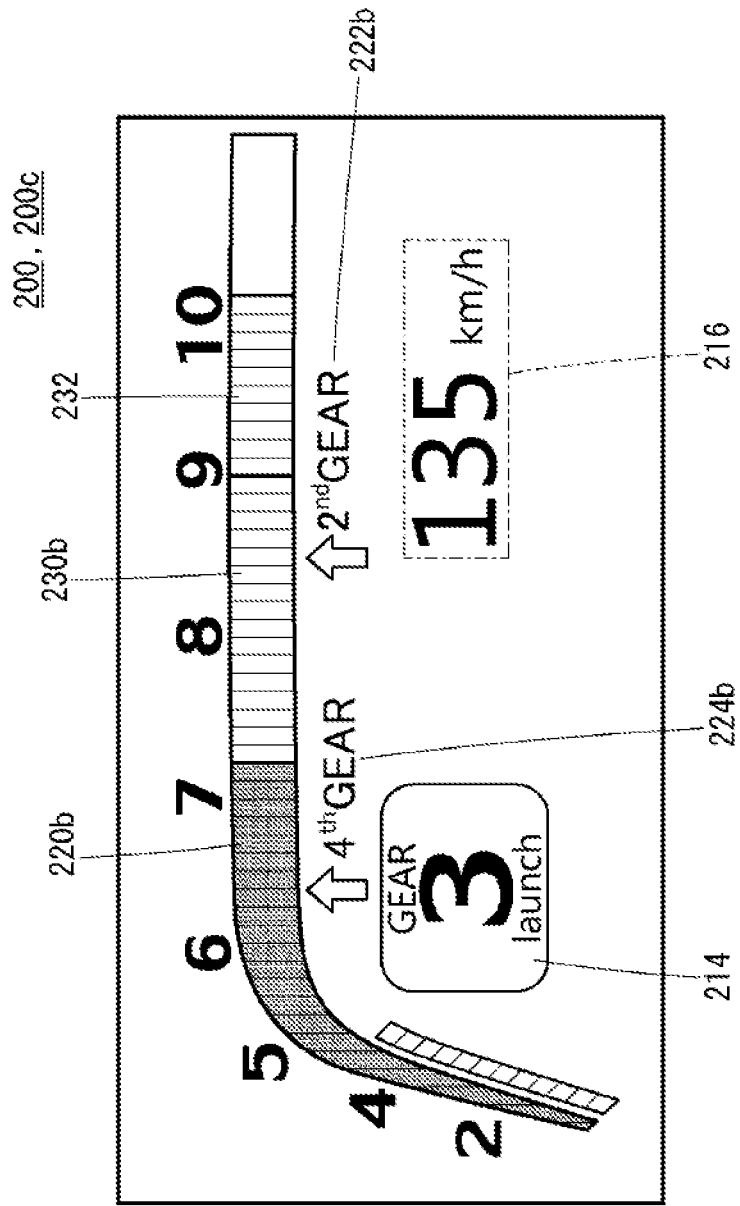
FIG. 15 is a diagram showing a display screen according to a second modified example.
Figure 16:
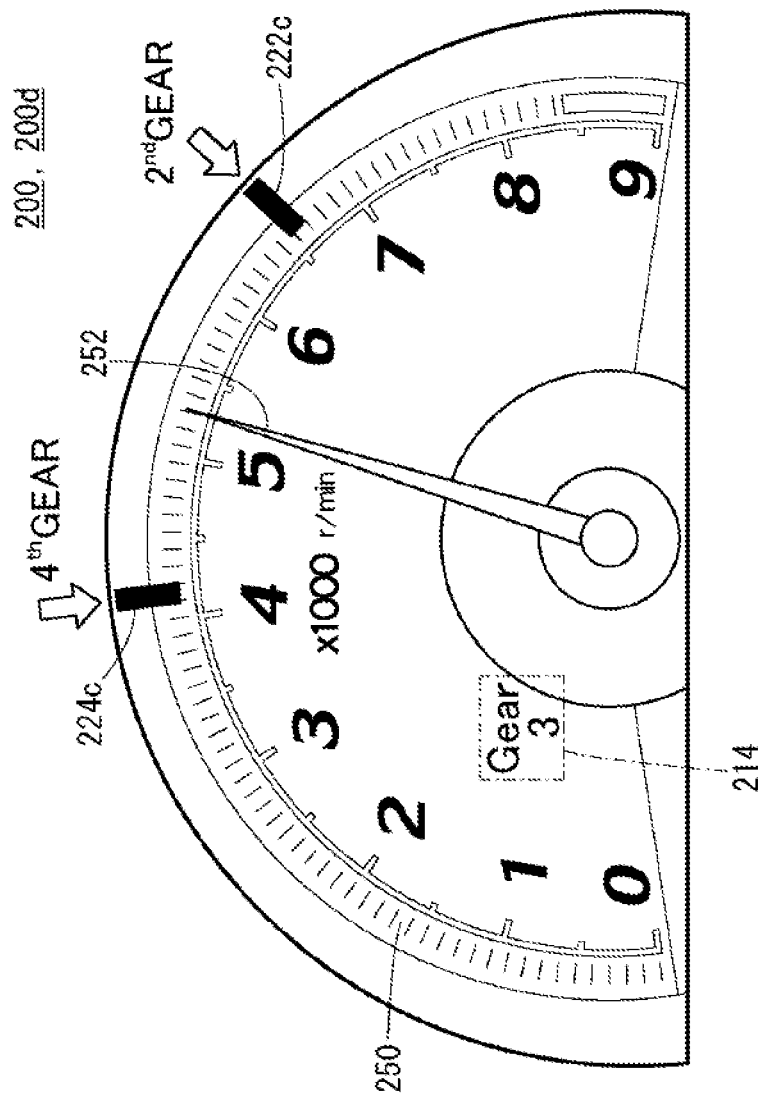
FIG. 16 is a diagram showing a display screen according to a third modified example.

FIGS. 14 to 16 are diagrams showing display screens 200 according to first to third modified examples. Hereinafter, the display screens 200 shown in FIGS. 14 to 16 are also referred to as the display screens 200b to 200d. The display screens 200b to 200d are all a type of the display screen 200 in the optimum Ne notification control. The same constituent components as those in the screens 200 and 300a to 300c shown in FIGS. 4, 9, 10, and 11 are denoted by the same reference numerals, and detailed description thereof is omitted.

The display screen 200b shown in FIG. 14 includes a revolution speed display region 20, a shift position display region 214, a revolution speed indicator 220a, optimum notification marks 222a and 224a, and a background region 230a. The revolution speed indicator 220a moves up and down in the background region 230a according to the revolution speed Ne. The optimum notification marks 222a and 224a move up and down in the background region 230a according to the optimum value Nopt (Nopt_d or Nopt_u). A scale of the engine revolution speed Ne is displayed to the left of the background region 230a.

The display screen 200c shown in FIG. 15 includes a shift position display region 214, a vehicle speed display region 216, a revolution speed indicator 220b, optimum notification marks 222b and 224b, a background region 230b, and a red zone notification mark 232.

The revolution speed indicator 220b has its dimension increased or reduced in the background region 230b according to the revolution speed Ne (in other words, the number of scale marks is increased or reduced). The optimum notification marks 222b and 224b are arranged around the background region 230b according to the optimum value Nopt (Nopt_d or Nopt_u). Around the background region 230b (thereabove or the like), a scale of the engine revolution speed Ne is displayed. The red zone notification mark 232 indicates a red zone of the revolution speed Ne.

The display screen 200d shown in FIG. 16 includes a shift position display region 214, optimum notification marks 222c and 224c, a scale region 250, and an indicator 252. The optimum notification marks 222c and 224c are arranged around the scale region 250 according to the optimum value Nopt (Nopt_d or Nopt_u). The indicator 252 changes its angle (rotation angle) according to the revolution speed Ne.

In the display screen 200a (FIG. 4) in the optimum Ne notification control according to the above embodiment, the engine revolution speed Ne, the optimum values Nopt (Nopt_d and Nopt_u), the shift position Ps (gear stage), the vehicle speed V, and the clutch state Scl. However, the embodiment is not limited thereto in terms of giving a predetermined notification to the driver when the revolution speed Ne is equal to the optimum value Nopt or the revolution speed Ne is included in the optimum range Ropt in a state where the clutch 40 is disconnected, for example. For example, an operation amount θap of the accelerator pedal 30 (position of the accelerator pedal 30) may be displayed.

<B-4. Evaluation Result Notification Control>

[B-4-1. Target Shift Change Operation]

In the evaluation result notification control according to the above embodiment, both of the shift-down operation and the shift-up operation are practiced (FIG. 5 and the like). However, any one of the shift-down operation and the shift-up operation may be practiced.

[B-4-2. Difference Dne]

In the evaluation result notification control according to the above embodiment, a difference between the optimum speed Nopt and the revolution speed Ne is set as the difference Dne (S35 and S41 in FIG. 5). However, in terms of notifying a deviation from the optimum range Ropt, a difference between a specific value in the optimum range Ropt and the revolution speed Ne may be set as the difference Dne. As for the specific value in the optimum range Ropt, when the detected revolution speed Ne is smaller than a minimum value in the optimum range Ropt, a difference between the minimum value and the revolution speed Ne can be set as the difference Dne. On the other hand, when the detected revolution speed Ne is larger than a maximum value in the optimum range Ropt, a difference between the maximum value and the revolution speed Ne can be set as the difference Dne.

[B-4-3. Notification]

In the evaluation result notification control according to the above embodiment, the difference Dne is displayed on the display device 16 (S37 and S43 in FIG. 5, FIG. 9, and FIG. 10) and the FB sounds are outputted from the speaker 18 (S38 and S44 in FIG. 5). However, the embodiment is not limited thereto in terms of notifying the difference Dne, for example. For example, only either one of the display on the display device 16 and the output of the FB sounds may be used. Alternatively, the difference Dne may be notified by imparting vibration corresponding to the difference Dne to the shift knob 60.

In the evaluation result notification control according to the above embodiment, the difference Dne is notified at the end of the shift change (S37, S38, S43, and S44 in FIG. 5). However, the embodiment is not limited thereto in terms of notifying the difference Dne, for example. For example, the difference Dne may also be displayed on the screen 200 in FIG. 4.

In the evaluation result notification control according to the above embodiment, the difference Dne itself is notified (FIGS. 9 to 12). However, the embodiment is not limited thereto, but points corresponding to the difference Dne may be given and a cumulative total value of the points may be displayed and notified with a sound or the like.

[B-4-4. Display Screen 300]

In the evaluation result notification control according to the above embodiment, the display screens 300a to 300c shown in FIGS. 9 to 11 are used. However, as in the case of the screens 200b to 200d (FIGS. 14 to 16) in the optimum Ne notification control, other display screens can also be used. Also, an operation amount θap of the accelerator pedal 30 (position of the accelerator pedal 30) may be displayed.

[B-4-5. FB Sound]

In the above embodiment, the number of the FB sounds is changed according to the difference Dne (FIG. 12). However, the embodiment is not limited thereto in terms of notifying the difference Dne with the FB sound, for example. The difference Dne can also be notified by changing the volume or output time of the FB sound according to the difference Dne, for example. Alternatively, the difference Dne itself can also be read with a voice.

In the above embodiment, the pattern of the FB sound is changed according to the positive or negative sign of the difference Dne (FIG. 12). However, the embodiment is not limited thereto in terms of notifying the difference Dne with the FB sound, for example. For example, the number of the FB sounds can also be set according to the absolute value of the difference Dne regardless of the positive or negative sign.

[B-4-6. Correction Processing]

In the above embodiment, the correction processing is performed using the longitudinal acceleration Glgt detected by the acceleration sensor 86 (S36 and S42 in FIG. 5 and FIG. 6). However, the embodiment is not limited thereto in terms of correcting the evaluation result according to the magnitude of impact associated with reconnection of the clutch 40 for a shift change, for example. For example, the correction processing can also be performed using vertical acceleration.

In the above embodiment, the correction processing is performed (S36 and S42 in FIG. 5). However, the embodiment is not limited thereto in terms of notifying the difference Dne, for example. The correction processing may be omitted.

<B-5. Others>

In the above embodiment, both of the optimum Ne notification control and the evaluation result notification control are executed (FIG. 2). However, only one of the above can also be executed.

In the above embodiment, when terminating the shift change practice (S17: YES in FIG. 2), the current shift change practice control is terminated without performing any particular processing. However, the embodiment is not limited thereto in terms of notifying the result of the shift change practice to the driver.

For example, when terminating the shift change practice (S17: YES in FIG. 2), the practice device 20 may output a cumulative total value (today's score) from the start of the practice (S11: YES) to the end of the practice (S17: YES) as a cumulative evaluation result through one of or both of the display device 16 and the speaker 18. The timing of output may be when the vehicle 10 is stopped (such as when the vehicle arrives at a goal set with a navigation device), for example.

Moreover, when the cumulative evaluation result is outputted through the display device 16, a graph (growth graph) indicating growth in the shift change operation can be used, for example. In the growth graph, the frequency of the difference Dne belonging to each of evaluation grades (for example, three grades of "Excellent", "Good", and "Bad") of the difference Dne is displayed in a line graph or the like for each date or practice.

Alternatively, display of a cumulative frequency (evaluation cumulative frequency display) for each grade of the difference Dne can also be used. In the evaluation cumulative frequency display, the frequency of the difference Dne belonging to each of the evaluation grades (for example, three grades of "Excellent", "Good", and "Bad") of the difference Dne is displayed in detail. For example, the frequencies of the respective grades "Excellent", "Good", and "Bad" in one practice (from S11: YES to S17: YES in FIG. 2) is displayed for shift-down, shift-up, and the total thereof.

Alternatively, display of a combination of map information with the engine revolution speed Ne and the optimum value Nopt (simultaneous map display) may be used. In the simultaneous map display, a map of a route through which the vehicle 10 travels (route map) is displayed on the display device 16. In the route map, a mark indicating the location of the vehicle 10 (current location mark) is displayed. In addition, a time chart of the engine revolution speed Ne and the optimum value Nopt in the map in the route through which the vehicle 10 travels is displayed simultaneously with the route map. In the time chart, a vertical line is displayed in a position corresponding to the current location mark in the route map. Thus, the driver can check the engine revolution speed Ne and the optimum value Nopt at a certain point while knowing the location of the vehicle 10 on the route map.

Alternatively, display of a level corresponding to the frequency of the difference Dne belonging to the high grade (for example, "Excellent") (level display) can also be used. In the level display, a mark (for example, a pin mark) indicating the level is displayed according to the level.

In the shift change practice control (FIG. 2) according to the above embodiment, the driver is notified through the display device 16, the speaker 18, and the vibration generator 56. However, in terms of improving the effect of the shift change practice, input from the driver (other than a driving operation) can also be allowed.

For example, the practice device 20 may input a voice of the driver to a microphone (not shown) and store the voice in synchronization with other data on the evaluation result notification control (FIG. 5) from the start of the practice (S11: YES) to the end of the practice (S17: YES). The input of the voice of the driver may be started and ended according to an operation to the operation input unit in the vehicle 10 or the practice device 20.

What is claimed is:

1. A shift change practice device for an operator to practice a shift change operation in a manual transmission vehicle provided with a clutch operable for the operator to disconnect and connect a transmission, thereby conducting a shift change from a first shift position to a second shift position during a disconnection of the clutch, the device comprising:

an optimum speed calculation unit configured to calculate an optimum value or an optimum range of an engine revolution speed for the second shift position;

a detector configured to detect an engine revolution speed in a state where the clutch is disconnected;

a revolution speed comparison unit configured to determine whether or not the detected engine revolution speed is equal to the optimum value or whether or not the detected engine revolution speed fall within the optimum range, in a state where the clutch is disconnected; and a notification instruction unit configured to cause an informing device to inform the operator of a result from the revolution speed comparison unit when it is determined that the detected engine revolution speed is equal to the optimum value or the detected engine revolution speed falls within the optimum range, in the state where the clutch is disconnected.

2. The shift change practice device according to claim 1, further comprising a vibration generator provided to a shift knob to vibrate the shift knob, wherein the informing instruction unit causes the vibration generator to vibrate the shift knob when the detected engine revolution speed is equal to the optimum value or the detected revolution speed falls within the optimum range.

3. The shift change practice device according to claim 1, further configured to detect a deceleration of the manual transmission vehicle, wherein the optimum speed calculation unit corrects the optimum value or the optimum range corresponding to a vehicle speed of the manual transmission vehicle based on the deceleration of the manual transmission vehicle.

4. The shift change practice device according to claim 1, further comprising:

a clutch state estimation unit configured to estimate that the clutch is disconnected when it is detected that an engine torque goes to zero after reaching a negative value or when it is detected that an engine rotational acceleration that is a time differential value of the engine revolution speed goes below an acceleration threshold.

5. The shift change practice device according to claim 1, further comprising:

a clutch state estimation unit configured to estimate that the clutch is disconnected when it is detected that an increase or decrease in the engine revolution speed does not correspond to an increase or decrease in a vehicle speed.

6. The shift change practice device according to claim 1, further comprising:

a display; and a display controller configured to display by the display a revolution speed indicator whose dimension changes according to the detected engine revolution speed and an optimum notification mark having its display position changes with respect to a display range of the revolution speed indicator according to the optimum value or the optimum range.

7. The shift change practice device according to claim 6, wherein the display is controlled to indicate the revolution speed indicator in a circular shape in such a manner that a size of the circular shape concentrically changes according to the detected engine revolution speed, and the display is controlled to indicate the optimum notification mark in a ring shape that is arranged concentrically with the revolution speed indicator.

8. A shift change practice device for an operator to practice a shift change operation in a manual transmission vehicle provided with a clutch operable for the operator to disconnect and connect a transmission, thereby conducting a shift change from a first shift position to a second shift position during a disconnection of the clutch, the device comprising:
   an optimum speed calculation unit configured to calculate an optimum value or an optimum range of an engine revolution speed for the second shift position;
   a detector configured to detect an engine revolution speed in a state where the clutch is disconnected;
   a difference calculation unit configured to calculate a difference between the detected engine revolution speed and at least one of the optimum value or the optimum range; and
   an informing instruction unit configured to cause an informing device to inform the operator of information indicating the difference when the shift change from the first shift position to the second shift position is conducted.

9. The shift change practice device according to claim 8, wherein
   the informing device comprises a speaker, and
   the informing instruction unit causes the speaker to output short sounds, the number of which corresponds to the difference.

10. The shift change practice device according to claim 9, wherein
    the informing instruction unit changes a pitch of the short sound depending on whether the difference is a positive or negative value.

11. The shift change practice device according to claim 8, wherein
    the informing device comprises a display device, and
    the informing instruction unit causes the display device to display an evaluation result corresponding to the difference for a predetermined period of time.

12. The shift change practice device according to claim 8, further configured to detect a magnitude of impact associated with the connection of the clutch in the second shift position, and further comprising:
    a correction unit configured to correct an evaluation result based on the difference, according to the magnitude of impact associated with the connection of the clutch.

13. The shift change practice device according to claim 12, wherein
    the correction unit corrects the evaluation result only during a predetermined period after the start of the shift change operation.

14. The shift change practice device according to claim 8, further configured to detect a deceleration of the manual transmission vehicle, wherein
    the optimum speed calculation unit corrects the optimum value or the optimum range corresponding to a vehicle speed of the manual transmission vehicle based on the deceleration of the manual transmission vehicle.

15. The shift change practice device according to claim 8, further comprising:
    a clutch state estimation unit configured to estimate that the clutch is disconnected when it is detected that an engine torque goes to zero after reaching a negative value or when it is detected that an engine rotational acceleration that is a time differential value of the engine revolution speed goes below an acceleration threshold.

16. The shift change practice device according to claim 8, further comprising:
    a clutch state estimation unit configured to estimate that the clutch is disconnected when it is detected that an increase or decrease in the engine revolution speed does not correspond to an increase or decrease in a vehicle speed.

17. The shift change practice device according to claim 8, further comprising:
    a display; and
    a display controller configured to display by the display a revolution speed indicator whose dimension changes according to the detected engine revolution speed and an optimum notification mark having its display position change with respect to a display range of the revolution speed indicator according to the optimum value or the optimum range.

18. The shift change practice device according to claim 17, wherein
    the display is controlled to indicate the revolution speed indicator in a circular shape in such a manner that a size of the circular shape concentrically changes according to the detected engine revolution speed, and
    the display is controlled to indicate the optimum notification mark in a ring shape that is arranged concentrically with the revolution speed indicator.

* * * * *